United States Patent
Sakurada et al.

(10) Patent No.: US 12,057,017 B2
(45) Date of Patent: Aug. 6, 2024

(54) AUTONOMOUS VEHICLE, AUTONOMOUS VEHICLE DISPATCH SYSTEM, AND MOBILE TERMINAL

(71) Applicant: TOYOTA JIDOSHA KABUSHIKI KAISHA, Aichi-ken (JP)

(72) Inventors: Shin Sakurada, Toyota (JP); Katsuya Hoshi, Nisshin (JP); Hiroaki Sugiyama, Nagoya (JP); Masahisa Sawada, Nagoya (JP); Hiroyuki Ito, Kariya (JP); Makoto Segi, Kariya (JP); Hiroki Hattori, Kariya (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 256 days.

(21) Appl. No.: 17/678,039

(22) Filed: Feb. 23, 2022

(65) Prior Publication Data
US 2022/0270490 A1 Aug. 25, 2022

(30) Foreign Application Priority Data
Feb. 25, 2021 (JP) ................... 2021-028176

(51) Int. Cl.
| G08G 1/00 | (2006.01) |
| B60W 60/00 | (2020.01) |
| G01C 21/34 | (2006.01) |
| G01C 21/36 | (2006.01) |
(Continued)

(52) U.S. Cl.
CPC ....... *G08G 1/202* (2013.01); *B60W 60/00253* (2020.02); *G01C 21/3415* (2013.01); *G01C 21/3617* (2013.01); *G01C 21/362* (2013.01); *G01C 21/3667* (2013.01);
(Continued)

(58) Field of Classification Search
CPC ............ G08G 1/202; G08G 1/096883; G08G 1/0969; G08G 1/096725; B60W 60/00253; B60W 2556/50; G01C 21/3415; G01C 21/3617; G01C 21/362; G01C 21/3667; G01C 21/3614; G01C 21/3682; H04W 4/029; H04W 4/40; H04W 4/024; G06Q 50/26
See application file for complete search history.

(56) References Cited

U.S. PATENT DOCUMENTS

| 11,493,353 B1* | 11/2022 | Konala ................. G05D 1/0212 |
| 11,841,236 B1* | 12/2023 | Aula ................... G01C 21/3614 |
| 11,846,514 B1* | 12/2023 | Kentley-Klay ....... G06T 15/205 |
(Continued)

FOREIGN PATENT DOCUMENTS

| CN | 112272842 A | 1/2021 |
| JP | 2003-217091 A | 7/2003 |
(Continued)

*Primary Examiner* — Sze-Hon Kong
(74) *Attorney, Agent, or Firm* — HAUPTMAN HAM, LLP

(57) ABSTRACT

A mobile terminal includes an input unit that is capable of receiving input of a dispatch request and a destination and a position determiner that is capable of obtaining a terminal position which is its own current position. In accordance with the dispatch request, an autonomous vehicle is designated as a vehicle that is to be dispatched. The autonomous vehicle includes an autonomous driving controller that performs driving control so as to track the mobile terminal based on the terminal position while on its way to pick up the user.

4 Claims, 17 Drawing Sheets

(51) Int. Cl.
*H04W 4/029* (2018.01)
*H04W 4/40* (2018.01)

(52) U.S. Cl.
CPC ............ *H04W 4/029* (2018.02); *H04W 4/40* (2018.02); *B60W 2556/50* (2020.02)

(56) References Cited

U.S. PATENT DOCUMENTS

| | | | |
|---|---|---|---|
| 2017/0213308 A1* | 7/2017 | Wellborn | A63G 31/16 |
| 2019/0220035 A1* | 7/2019 | Wengreen | G05D 1/0231 |
| 2020/0124425 A1* | 4/2020 | Wengreen | G01C 21/3438 |
| 2020/0273333 A1* | 8/2020 | Elshenawy | G08G 1/096805 |
| 2020/0363216 A1* | 11/2020 | Elvanoglu | G01C 21/30 |
| 2021/0088341 A1* | 3/2021 | Macneille | G06Q 10/02 |
| 2021/0095989 A1* | 4/2021 | Matlack | G05D 1/0088 |
| 2021/0097866 A1* | 4/2021 | Leary | G05D 1/0248 |
| 2021/0114460 A1* | 4/2021 | Dubey | B60W 60/00 |
| 2021/0209713 A1* | 7/2021 | Imtiyaz | G06Q 50/40 |
| 2021/0219257 A1* | 7/2021 | Anand | H04W 64/006 |
| 2021/0366286 A1 | 11/2021 | Kajiwara et al. | |
| 2022/0097734 A1* | 3/2022 | Limaye | G06V 10/44 |
| 2022/0164737 A1* | 5/2022 | Kojo | G06Q 10/06311 |
| 2022/0196416 A1* | 6/2022 | Suzuki | G06Q 10/02 |
| 2022/0205794 A1* | 6/2022 | Friedman | G06V 20/56 |
| 2022/0221867 A1* | 7/2022 | Taveira | G06Q 50/30 |
| 2022/0222597 A1* | 7/2022 | Neese | G06Q 10/06311 |
| 2023/0401630 A1* | 12/2023 | Nguyen | G06Q 30/0609 |

FOREIGN PATENT DOCUMENTS

| | | |
|---|---|---|
| JP | 2006-284246 A | 10/2006 |
| JP | 200758345 A | 3/2007 |
| JP | 2016-091411 A | 5/2016 |
| JP | 2019-046323 A | 3/2019 |

* cited by examiner

AUTONOMOUS VEHICLE, AUTONOMOUS VEHICLE DISPATCH SYSTEM, AND MOBILE TERMINAL

CROSS REFERENCE TO RELATED APPLICATION

This application claims priority to Japanese Patent Application No. 2021-028176 filed on Feb. 25, 2021, which is incorporated herein by reference in its entirety including the specification, claims, drawings, and abstract.

TECHNICAL FIELD

The present specification discloses an autonomous vehicle, an autonomous vehicle dispatch system, and a mobile terminal.

BACKGROUND

Services in which autonomous vehicles are used as taxis are called driverless taxi (or robot taxi) services. In this type of service, a traveling route from a pickup location to a destination is automatically generated, and an autonomous vehicle autonomously travels along this traveling route.

For example, according to JP 2007-58345 A, in a taxi service in which a vehicle operated by a human driver is used, a current location obtained using a GPS function of a mobile terminal is set as a departure location (pickup location), a traveling route from the departure location to a destination is determined, and a taxi fare corresponding to this traveling route is calculated.

In some driverless taxi services, for example, a designated waiting area near a current position of a user is designated as a pickup location, and the user moves to the designated waiting area. The present specification discloses an autonomous vehicle, an autonomous vehicle dispatch system, and a mobile terminal that enable improved user convenience in a driverless taxi service, especially in terms of setting a pickup location.

SUMMARY

The present specification discloses an autonomous vehicle dispatch system. The autonomous vehicle dispatch system includes a mobile terminal and an autonomous vehicle. The mobile terminal, which is carried by a user, includes an input unit that is capable of receiving input of a dispatch request and a destination and a position determiner that is capable of obtaining a terminal position which is its own current position. In accordance with the dispatch request, the autonomous vehicle is designated as a vehicle that is to be dispatched. The autonomous vehicle includes an autonomous driving controller that performs driving control so as to track the mobile terminal based on the terminal position while on its way to pick up the user.

With the above-described structure, as the autonomous vehicle tracks the user while traveling autonomously on its way to pick up the user, it is not necessary for the user to move to a designated waiting location, which enables improved convenience.

In the above-described structure, the autonomous vehicle dispatch system may include a vehicle control device that is capable of communication with the mobile terminal and the autonomous vehicle. In this case, the input unit of the mobile terminal is capable of receiving input of one of the terminal position and a nearby waiting location provided around the terminal position as a pickup location. The vehicle control device includes a traveling route generator that generates a traveling route that connects from a current position of the autonomous vehicle to the destination via the pickup location and a transceiver that is capable of transmitting information concerning the traveling route to the autonomous vehicle. After reception of the dispatch request, the transceiver intermittently receives information concerning the terminal position from the mobile terminal. In response to detecting, based on the intermittently received terminal position, that the mobile terminal is moving away from the pickup location over time, the traveling route generator designates the most recently received terminal position as a new pickup location and regenerates a traveling route that passes through the new pickup location. In response, the autonomous driving controller of the autonomous vehicle performs the driving control based on the regenerated traveling route.

With the above-described structure, when, for example, the user attempts to move closer to the destination on foot rather than wasting time just waiting for the vehicle to arrive and pick them up, the pickup location is changed successively as the user moves, which enables performing autonomous driving so as to follow the moving user in order to meet them.

In the above-described structure, the mobile terminal may include a display that is capable of displaying a map image which depicts the traveling route.

With the above-described structure, the traveling route may be presented to the user to persuade the user to move along the traveling route. This discourages the user from deviating from the traveling route and can thereby prevent the user and the dispatched vehicle from missing each other.

In the above-described structure, the vehicle control device may include an arrival time calculator that calculates an estimated time of arrival at which the dispatched vehicle is expected to arrive at the pickup location. In this case, the display of the mobile terminal is capable of displaying the estimated time of arrival.

With the above-described structure, as the user is informed of the estimated time of arrival of the dispatched vehicle, the user can be provided with information upon which to base a decision as to whether to stay at the pickup location or to start walking toward the destination on their own.

The present specification also discloses an autonomous vehicle. The autonomous vehicle is capable of communication with a mobile terminal. The mobile terminal includes an input unit that is capable of receiving input of a dispatch request and a destination and a position determiner that is capable of obtaining a terminal position which is its own current position. In response to output of the dispatch request from the mobile terminal, in accordance with the dispatch request, the autonomous vehicle is designated as a vehicle that is to be dispatched. This autonomous vehicle includes an autonomous driving controller that performs driving control so as to track the mobile terminal based on the terminal position while on its way to pick up the user.

In the above-described structure, the input unit of the mobile terminal may be capable of receiving input of one of the terminal position and a nearby waiting location provided around the terminal position as a pickup location. In this case, the autonomous vehicle includes a traveling route generator that generates a traveling route that connects from the vehicle's current position (a "self vehicle position") to the destination via the pickup location. After reception of the dispatch request, in response to detecting, based on the terminal position that is intermittently output from the mobile terminal, that the mobile terminal is moving away from the pickup location over time, the traveling route generator designates the most recently received terminal position as a new pickup location and regenerates a traveling route that passes through the new pickup location. In response, the autonomous driving controller performs the driving control based on the regenerated traveling route.

The present specification also discloses a mobile terminal. The mobile terminal includes an input unit that is capable of receiving input of a dispatch request and a destination; and a position determiner that is capable of obtaining a terminal position which is its own current position. The input unit is capable of receiving input of one of the terminal position and a nearby waiting location provided around the terminal position as a pickup location for an autonomous vehicle that, in accordance with the dispatch request, is designated as a vehicle that is to be dispatched.

In the above-described structure, the mobile terminal may include a display that is capable of displaying a map image which depicts a traveling route that connects from a current position of the autonomous vehicle to the destination via the pickup location. In this case, in response to the mobile terminal itself moving away from the pickup location over time, the display displays the traveling route for which the most recent terminal position is designated as a new pickup location, and which is regenerated so as to pass through the new pickup location.

In the above-described structure, the display may be capable of displaying an estimated time of arrival at which the dispatched vehicle is expected to arrive at the pickup location.

The autonomous vehicle, the autonomous vehicle dispatch system, and the mobile terminal disclosed in the present specification enable improved user convenience in a driverless taxi service, especially in terms of setting a pickup location.

BRIEF DESCRIPTION OF DRAWINGS

Embodiments of the present disclosure will be described based on the following figures, wherein.

DESCRIPTION OF EMBODIMENTS

Figure 1:
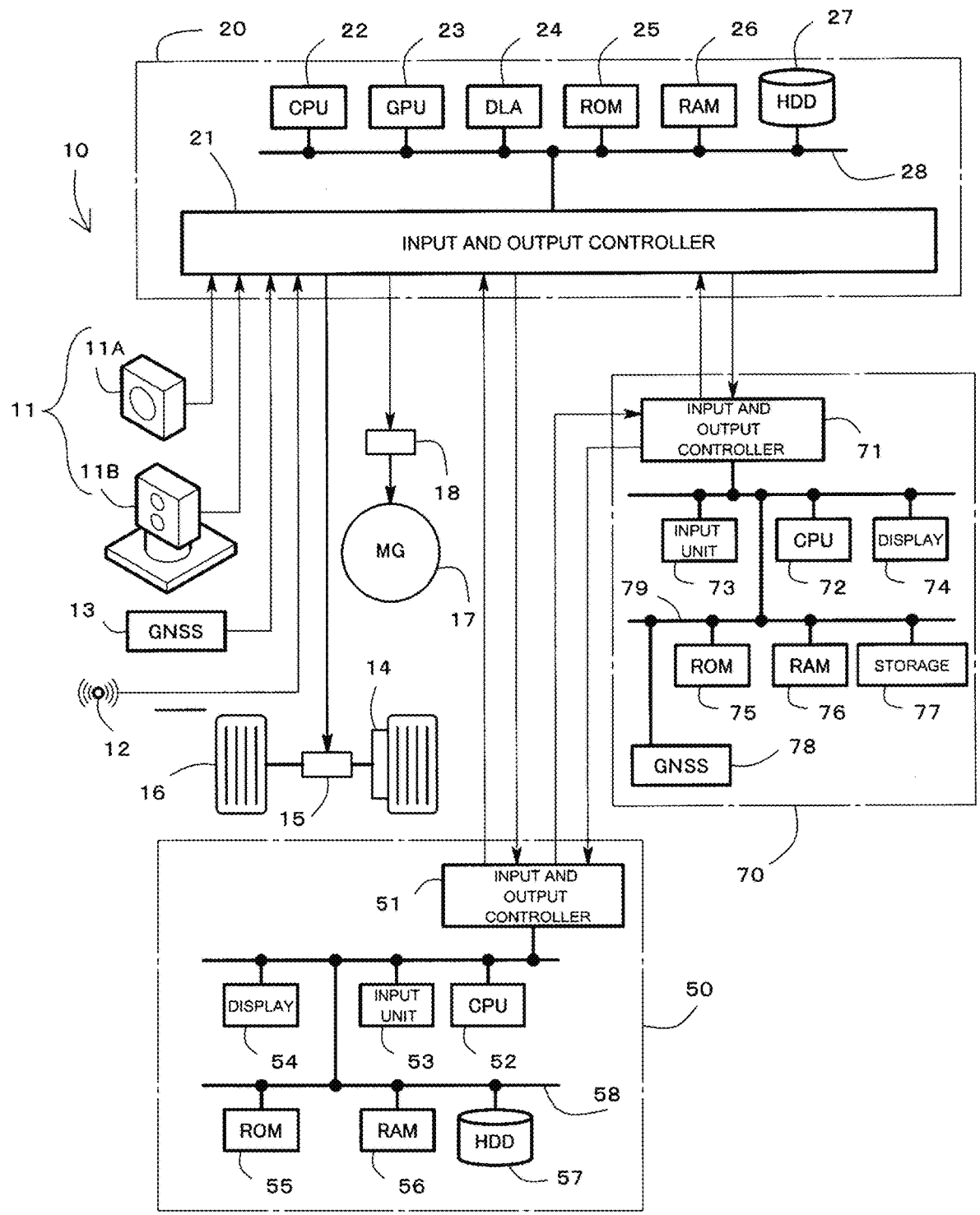
FIG. 1 is a hardware configuration diagram illustrating an autonomous vehicle dispatch system according to an embodiment.

Embodiments of the present disclosure will be described below with reference to the accompanying drawings. The shapes, materials, numbers, and values in the following description are given by way of illustration and may be modified as desired according to specifications of an autonomous vehicle dispatch system. In the following description, equivalent elements in all drawings are denoted by the same reference numerals.

Figure 3:
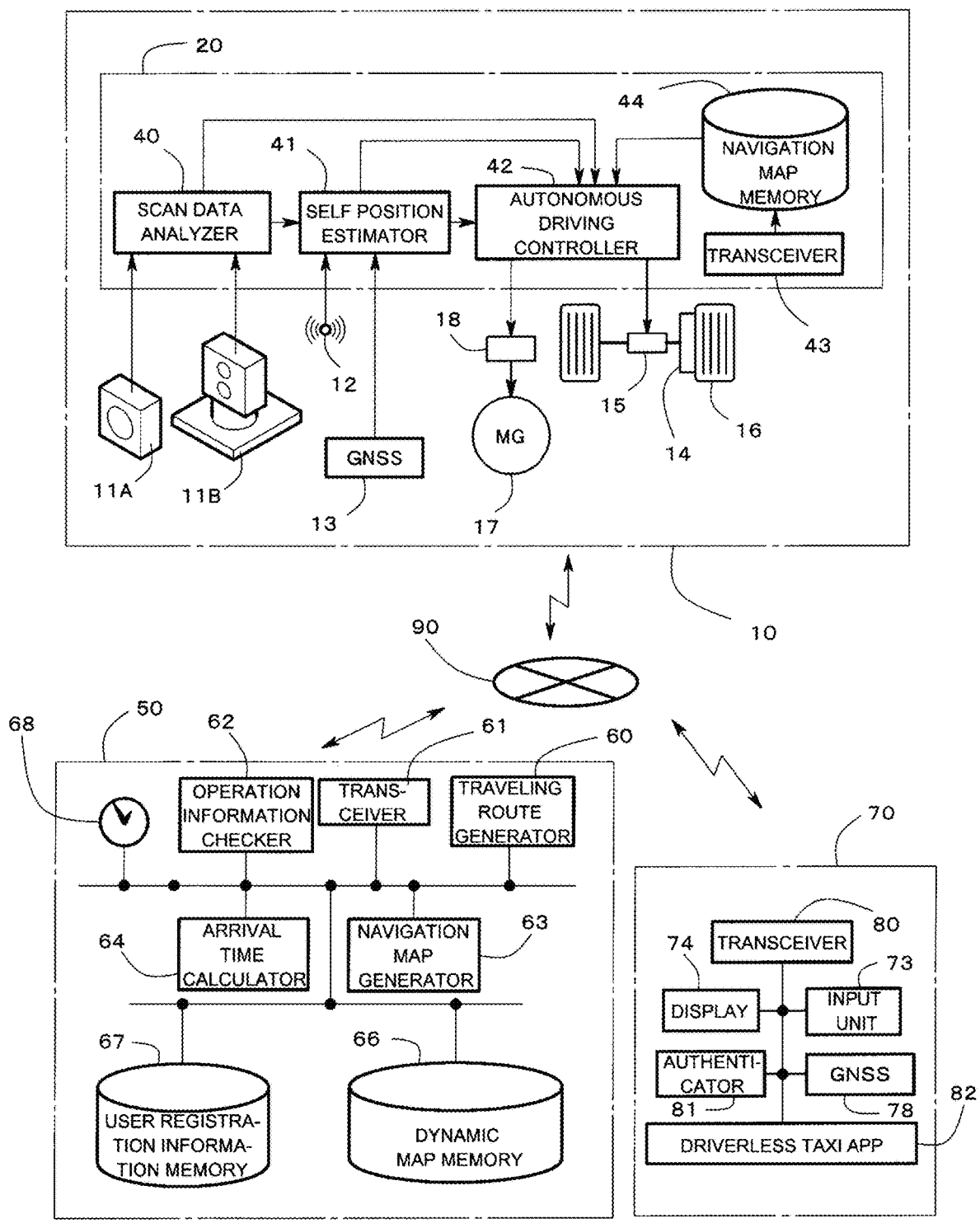
FIG. 3 is a functional block diagram illustrating the autonomous vehicle dispatch system according to the illustrated embodiment.

FIG. 1 illustrates a hardware configuration of an autonomous vehicle dispatch system according to an embodiment, and FIG. 3 illustrates a diagram including functional blocks as part of this system. The autonomous vehicle dispatch system according to the illustrated embodiment includes an autonomous vehicle 10, a vehicle control device 50, and a mobile terminal 70.

The autonomous vehicle 10, the vehicle control device 50, and the mobile terminal 70 are capable of communication with each other via a communication platform such as the Internet 90. The autonomous vehicle 10 is capable of moving through autonomous driving, and the mobile terminal 70 is carried by a user who uses a driverless taxi service that is provided by the autonomous vehicle 10. As such, the autonomous vehicle 10, which is mobile, and the mobile terminal 70 are capable of communication with the vehicle control device 50 via wireless communication.

Autonomous Vehicle

Figure 2:
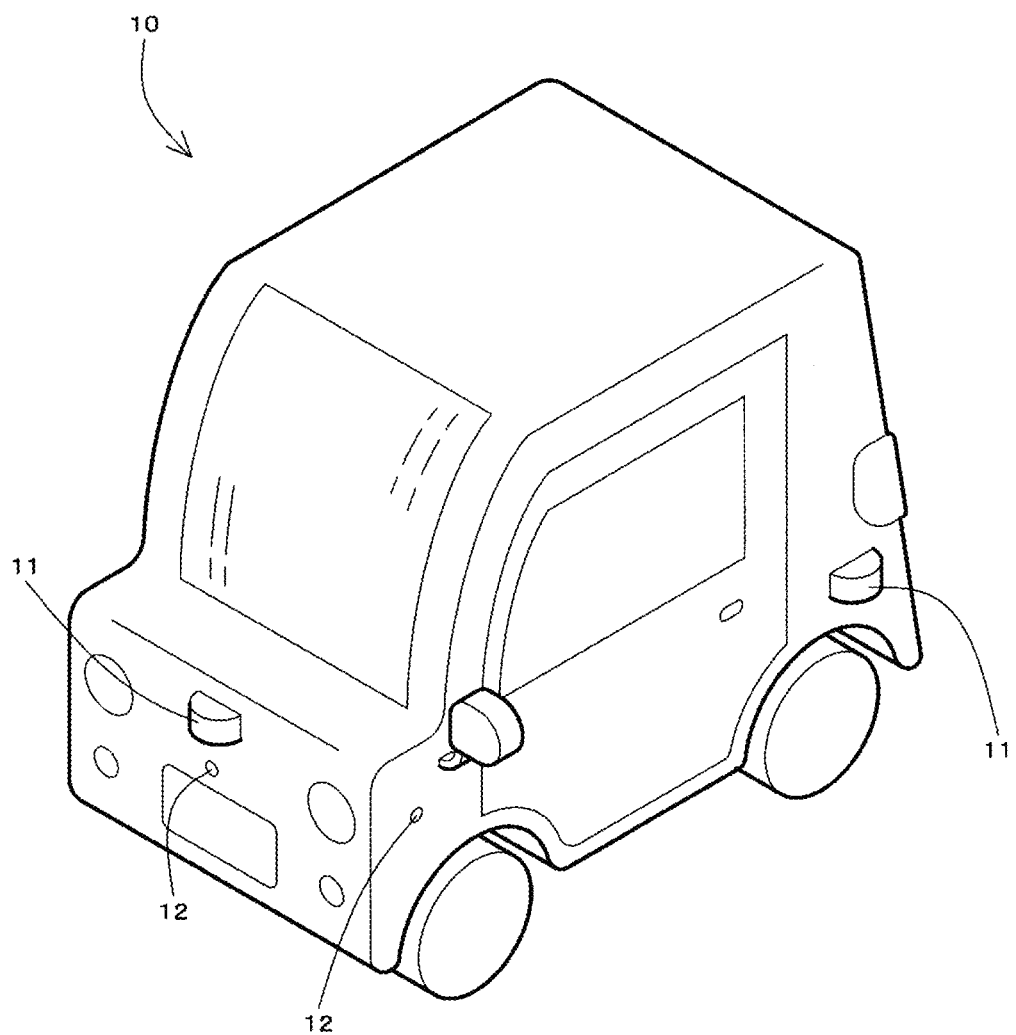
FIG. 2 is a perspective view illustrating an autonomous vehicle according to the illustrated embodiment.

FIG. 2 illustrates an outer appearance of the autonomous vehicle 10. For example, the autonomous vehicle 10 is a small vehicle that is designed to carry one or two passengers, and which is also called a personal mobility vehicle or a micromobility vehicle.

The autonomous vehicle 10 is capable of autonomous driving at, for example, driving automation level 4 or 5 defined by the United States Society of Automotive Engineers (SAE). The autonomous vehicle 10 may include steering equipment such as a steering wheel in the cabin so that it can be manually operated by an onboard user.

In the autonomous vehicle dispatch system according to the illustrated embodiment, the autonomous vehicle 10 serving as a personal mobility vehicle is used as a driverless taxi. In particular, when it is used by one passenger, it provides a higher degree of user flexibility than when used by a large group of users. For example, during a period of time in which a user waits for the autonomous vehicle 10 that is on its way to pick up the user, the user may change their mind and wish to begin walking toward the destination, rather than waiting at the initially set pickup location.

In consideration of the above, in the dispatch system according to the illustrated embodiment, as will be described below, when, in accordance with a dispatch request, the autonomous vehicle 10 is designated as a vehicle that is to be dispatched, autonomous driving control of the autonomous vehicle 10 is performed so as to track the mobile terminal 70 that is carried by a person (user) who wishes to use the driverless taxi service, while on its way to pick up the user.

Specifically, in the dispatch system according to the illustrated embodiment, a position of the mobile terminal 70 (terminal position) is intermittently obtained. The pickup location is changed if it is detected that the mobile terminal 70 is moving away from the pickup location over time. When changed, the pickup location is set to the most recently received terminal position. Additionally, a traveling route is regenerated so as to pass through the new, post-change pickup location, which enables providing a pickup service that is also able to respond to a user's change of mind.

Referring to FIGS. 1 and 2, the autonomous vehicle 10 is a battery electric vehicle (BEV) that includes a rotary electric machine 17 (motor) serving as a drive source and includes a battery (not illustrated) serving as an electric power source. As described above, the autonomous vehicle 10 is a small vehicle that is designed to carry one or two passengers. As such, due to its vehicle size, the battery space is limited, and therefore the range is also limited. In consideration of the above, a driverless taxi service is deployed using the autonomous vehicle 10 as a means of, for example, short-distance transportation in urban areas.

As a driving control mechanism, the autonomous vehicle 10 includes a steering mechanism 15 configured to steer wheels 16 and a brake mechanism 14 configured to brake the wheels 16. The steering mechanism 15 includes, for example, a tie rod (not illustrated) configured to turn the wheels 16 for steering and a steering motor (not illustrated) that is capable of moving the tie rod in the vehicle width direction. The brake mechanism 14 includes, for example, a disc brake mechanism (not illustrated) and a motor pump (not illustrated) configured to adjust the oil pressure of brake oil in the disc brake mechanism (in other words, the pressure applied to press brake pads against the brake disc). The autonomous vehicle 10 includes an inverter 18 configured to control the output of the rotary electric machine 17.

The autonomous vehicle 10 also incorporates a mechanism that enables autonomous driving (also called "self-driving"). Specifically, as the mechanism that enables autonomous driving, the autonomous vehicle 10 includes a camera 11A, a LiDAR unit 11B, a proximity sensor 12, a position determiner 13, and a controller 20.

Referring to FIG. 2, the autonomous vehicle 10 has a sensor unit 11 on each of its front, back, and sides. The sensor unit 11 includes the camera 11A (see FIG. 1) and the LiDAR unit 11B.

The LiDAR unit 11B is a sensor unit for autonomous driving, in which LiDAR (light detection and ranging), that is, a technique of measuring a distance from a nearby object with laser light, is used. The LiDAR unit 11B includes an emitter configured to emit infrared laser light toward outside the vehicle, a receiver configured to receive reflected light, and a motor configured to rotate the emitter and the receiver.

For example, the emitter emits infrared laser light towards the area around the vehicle. When the laser light emitted from the emitter collides with a nearby object in the area of the autonomous vehicle 10, its reflection is received by the receiver. Based on the length of time as measured from the emission from the emitter to the reception by the receiver, a distance between the point of reflection and the receiver is determined. As the emitter and the receiver are rotated using the motor, a laser beam is scanned in both horizontal and vertical directions so that three-dimensional point group data concerning the surrounding environment around the autonomous vehicle 10 can be obtained.

Returning to FIG. 1, the camera 11A captures an image with a field of view similar to that of the LiDAR unit 11B. The camera 11A includes, for example, an image sensor such as a CMOS sensor or a CCD sensor. An image captured by the camera 11A (captured image) is subjected to image recognition as will be described below, to recognize a nearby object around the autonomous vehicle 10. The coordinates of distance-measuring data obtained by the LiDAR unit 11B and the coordinates of the captured image are then aligned with each other to enable detection of what attribute the object has and how far it is away from the autonomous vehicle 10.

The proximity sensor 12 is, for example, an infrared sensor, which is provided on each of the vehicle's front, back, and sides as illustrated in FIG. 2. For example, when the autonomous vehicle 10 arrives at the pickup location, the proximity sensor 12 detects a projection such as a sidewalk curb. This detection enables curb docking to control the autonomous vehicle 10 to get close to and stop along the curb.

The position determiner 13 is a system that performs position measurement using satellites; for example, a GNSS (global navigation satellite system) may be used. The position determiner 13 and a dynamic map are used as will be described below, enabling estimation of a self vehicle position with an accuracy of within a satellite positioning error range.

The controller 20 may be, for example, an electronic control unit (ECU) of the autonomous vehicle 10 and is composed of a computer (electronic calculator). The controller 20 includes, as its hardware configuration, an input and output controller 21 that controls data input and output. The controller 20 also includes, as processors, a CPU 22, a GPU 23 (graphics processing unit), and a DLA 24 (Deep Learning Accelerator). The controller 20 also includes, as memory, a ROM 25, a RAM 26, and a hard disk drive 27 (HDD). It should be noted that an SSD (solid-state drive) or another memory device may be used in place of the hard disk drive 27. These components are connected to an internal bus 28.

At least one of the ROM 25 and the hard disk drive 27 serving as a memory device stores a program for performing autonomous driving control (also called "self-driving control") of the autonomous vehicle 10. This program when executed by, for example, the CPU 22 of the controller 20 provides the controller 20 with functional blocks as illustrated in FIG. 3. The above-described program may be stored in a non-transient computer-readable storage medium such as a DVD so that the program when executed by the CPU 22 provides functional blocks as illustrated in FIG. 3. As such, the controller 20 includes, as functional blocks, a scan data analyzer 40, a self position estimator 41, an autonomous driving controller 42, a transceiver 43, and a navigation map memory 44.

The scan data analyzer 40 obtains a captured image that is captured by the camera 11A. The scan data analyzer 40 performs image recognition on the obtained captured image using a known deep learning approach such as supervised learning based SSD (Single Shot Multibox Detector) or YOLO (You Only Look Once). Through this image recognition, detection of an object in the captured image and recognition of its attribute (for example, vehicle, pedestrian, or building) are performed.

The scan data analyzer 40 also obtains three-dimensional point group data from the LiDAR unit 11B. The scan data analyzer 40 then clusters the three-dimensional point group data into a plurality of clusters. The scan data analyzer 40 generates surrounding data by aligning the coordinates of the captured image that has been subjected to the image recognition with the coordinates of the three-dimensional point group data that has been subjected to the clustering. Based on the surrounding data, what attribute the object has and how far it is away from the autonomous vehicle 10 can be detected. This surrounding data is transmitted to the self position estimator 41 and the autonomous driving controller 42.

The self position estimator 41 obtains self position information (latitude, longitude, and altitude) from the position determiner 13. For example, the self position estimator 41 obtains self position information from satellites. The self position estimator 41 may correct the self position information obtained from the position determiner 13. For example, the self position estimator 41 performs matching between a three-dimensional image from a dynamic map (described below) stored in the navigation map memory 44 and a surrounding image captured by the scan data analyzer 40. The self position estimator 41 further obtains self position information that is determined on the dynamic map through the matching and uses this position information to compensate for a positioning error by the position determiner 13. The self position information (self vehicle position information) obtained in this manner is transmitted to the autonomous driving controller 42.

Navigation map data is transmitted from the vehicle control device 50 to the transceiver 43. As will be described below, this navigation map data includes dynamic map data and traveling route information. The navigation map data received by the transceiver 43 is stored in the navigation map memory 44.

The autonomous driving controller 42 performs driving control of the autonomous vehicle 10 based on the navigation map data stored in the navigation map memory 44, the self position information (self vehicle position information) transmitted from the self position estimator 41, and the surrounding data transmitted from the scan data analyzer 40.

For example, based on the self position and the traveling route included in the navigation map data, a global path is set. A local path is then set based on the surrounding data so that, for example, an obstruction in front is avoided. According to these paths, the autonomous driving controller 42 controls the brake mechanism 14, the steering mechanism 15, and the inverter 18.

Vehicle Control Device

The vehicle control device 50 is installed in, for example, the premises of a driverless taxi service provider company. The vehicle control device 50 is composed of, for example, a computer (electronic calculator). Referring to FIG. 1, the vehicle control device 50 includes, as its hardware configuration, an input and output controller 51, a CPU 52, an input unit 53, and a display 54. The vehicle control device 50 also includes, as memory, a ROM 55, a RAM 56, and a hard disk drive 57 (HDD). These components are connected to an internal bus 58.

At least one of the ROM 55 and the hard disk drive 57 serving as a memory device stores a program for performing autonomous driving control of the autonomous vehicle 10. This program when executed by, for example, the CPU 52 of the vehicle control device 50 provides the vehicle control device 50 with functional blocks as illustrated in FIG. 3. The above-described program may be stored in a non-transient computer-readable storage medium such as a DVD so that the program when executed by the CPU 52 provides functional blocks as illustrated in FIG. 3. As such, the vehicle control device 50 includes, as functional blocks, a traveling route generator 60, a transceiver 61, an operation information checker 62, a navigation map generator 63, an arrival time calculator 64, a dynamic map memory 66, a user registration information memory 67, and a clock 68.

The dynamic map memory 66 is capable of storing dynamic map data. The dynamic map is a three-dimensional map which contains, for example, positions and shapes (three-dimensional shapes) of roads. Three-dimensional shapes of roads include, for example, their gradients and widths. The dynamic map also contains, for example, positions of traffic lanes, pedestrian crossings, stop lines, and other road markings on roads. Additionally, the dynamic map also contains, for example, positions and shapes (three-dimensional shapes) of buildings, traffic signals, and other constructions near roads. Further, the dynamic map also contains, for example, positions and shapes of parking lots.

For example, a geographic coordinate system including latitude and longitude is used for the dynamic map. During autonomous driving of the autonomous vehicle 10, the autonomous vehicle 10 obtains the latitude and longitude of its self position (self vehicle position) from the self position estimator 41 and thereby estimates the self position on the dynamic map.

Figure 13:
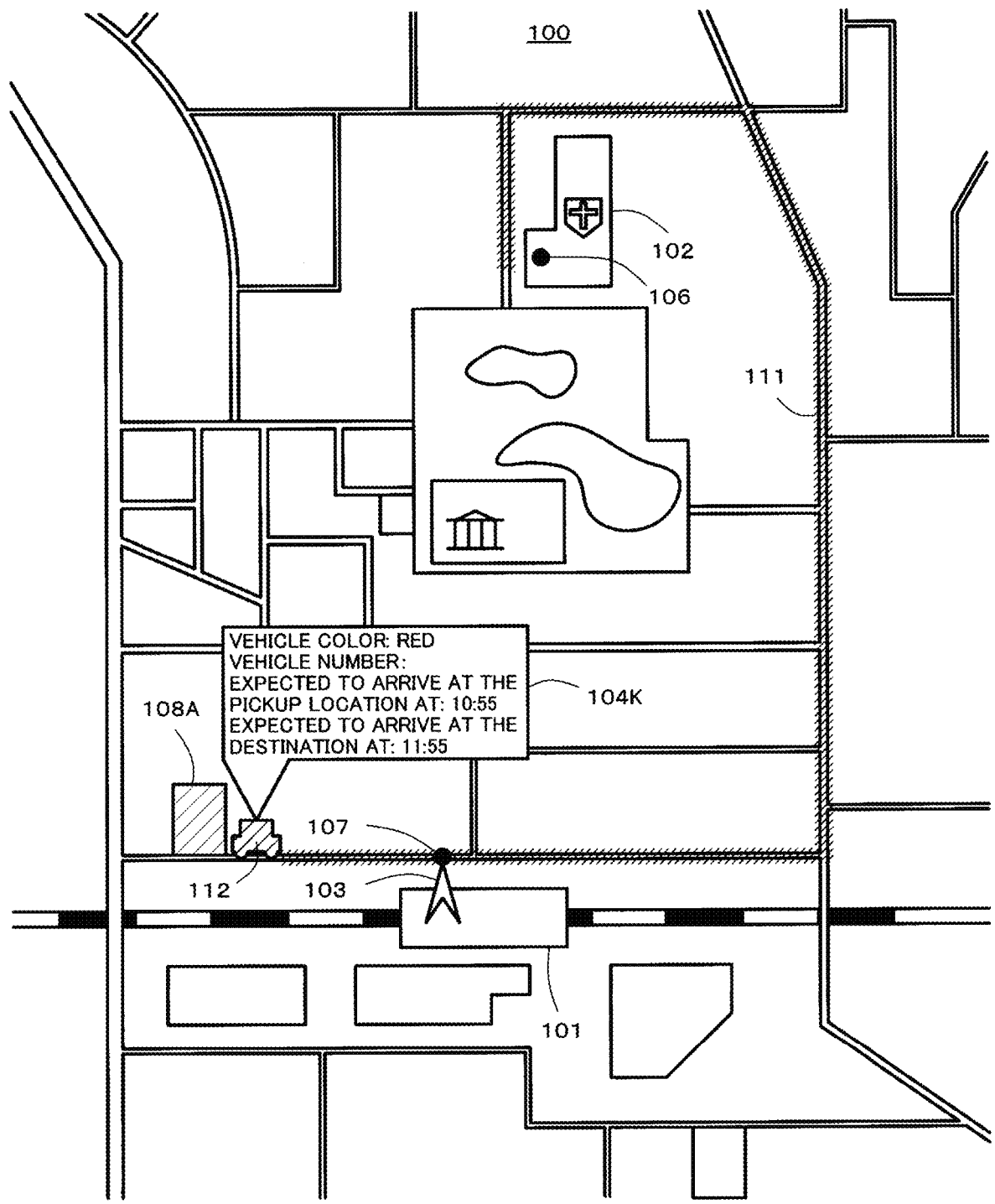
FIG. 13 is an image of the driverless taxi app that is being executed, the image illustrating a navigation screen used while the vehicle is on its way to pick up the user.

Based on a pickup location and a destination transmitted from the mobile terminal 70 and a current position of the autonomous vehicle 10, the traveling route generator 60 generates a traveling route on the dynamic map. This traveling route connects from the current position of the autonomous vehicle 10 to the destination via the pickup location. Referring, for example, to FIG. 13 which will be described below, hatching represents a traveling route 111 which connects from a parking lot 108A to a destination 106 via a pickup location 107.

The navigation map generator 63 generates a navigation map image which depicts the traveling route generated by the traveling route generator 60. For example, dynamic data depicting the traveling route is transmitted to the autonomous vehicle 10. Also, two-dimensional map image data depicting the traveling route is transmitted to the mobile terminal 70.

The arrival time calculator 64 calculates an estimated time of arrival at which the autonomous vehicle 10 is expected to arrive at the pickup location while on its way to pick up the user and calculates an estimated time of arrival at which the autonomous vehicle 10 is expected to arrive at the destination after the user's ride. For example, the arrival time calculator 64 obtains speed limit and traffic congestion information concerning the traveling route and obtains the current time from the clock 68 to calculate these two types of estimated times of arrival.

The operation information checker 62 obtains operation information concerning a plurality of autonomous vehicles 10 which provide a driverless taxi service. For example, the operation information checker 62 confirms whether each of the autonomous vehicles 10 is being used as a driverless taxi or is vacant. The operation information checker 62 also confirms the state of charge of each of the autonomous vehicles 10. As will be described below, the state of charge of each of the autonomous vehicles 10 is used as information upon which to base a decision when selecting a vehicle.

The user registration information memory 67 stores driverless taxi service account information. The account information includes, for example, user's name and birth date, an identification code for the mobile terminal 70, and cumulative use time. In particular, storing the identification code for the mobile terminal 70 enables intermittently accessing the mobile terminal 70 while an autonomous vehicle 10 is on its way to pick up the user to obtain position measurement information, as will be described below.

Mobile Terminal

The mobile terminal 70 is a communication terminal device that is carried by a user who uses a driverless taxi service. The mobile terminal 70 may be, for example, a smartphone. FIG. 1 illustrates a hardware configuration of the mobile terminal 70. The mobile terminal 70 includes an input and output controller 71, a CPU 72, an input unit 73, a display 74, and a position determiner 78. The mobile terminal 70 also includes, as memory, a ROM 75, a RAM 76, and a storage device 77. These components are connected to an internal bus 79.

The input unit 73 and the display 74 may be integral with each other in the form of a touch panel. As will be described below, the input unit 73 is capable of receiving input of a dispatch request, a pickup location, and a destination in the process of using a driverless taxi service.

The position determiner 78 is capable of obtaining a terminal position which is its own current position. For example, the position determiner 78 is a system that performs position measurement using satellites, which is similar to the position determiner 13 of the autonomous vehicle 10; for example, a GNSS (global navigation satellite system) may be used.

At least one of the ROM 75 and the storage device 77 serving as a memory device stores a program for using a driverless taxi service that is provided by the autonomous vehicle 10. This program when executed by, for example, the CPU 72 of the mobile terminal 70 provides the mobile terminal 70 with functional blocks as illustrated in FIG. 3. The above-described program may be stored in a non-transient computer-readable storage medium such as a DVD so that the program when executed by the CPU 72 provides functional blocks as illustrated in FIG. 3. As such, the mobile terminal 70 includes, as functional blocks, a transceiver 80, an authenticator 81, and a driverless taxi app 82.

As will be described below, the authenticator 81 is provided to authenticate the passenger when they enter or exit the autonomous vehicle 10. To use a driverless taxi service, the driverless taxi app 82 is activated by the user of the mobile terminal 70.

For example, in response to the activation of the driverless taxi app 82, the display 74 displays an input form where account information (such as the user's name and the identification code for the mobile terminal 70) is input. The account information that has been input is stored in the user registration information memory 67 of the vehicle control device 50. Various types of settings or selections are performed through the operation of the driverless taxi app 82 along a driving control flow that will be described below.

Driving Control Flow

Figure 4:
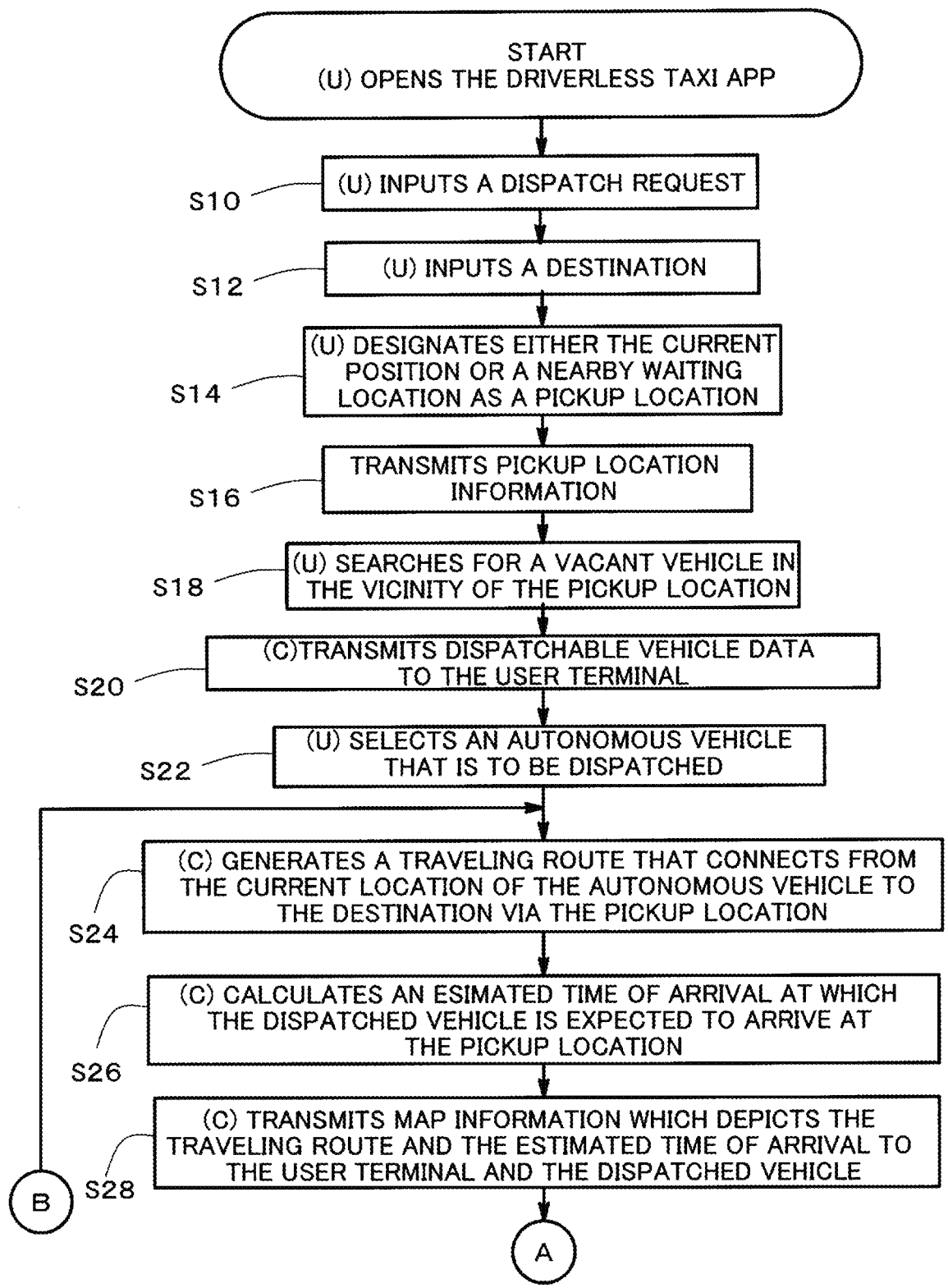
FIG. 4 illustrates a driving control flow (1 of 2) of the autonomous vehicle according to the illustrated embodiment.
Figure 5:
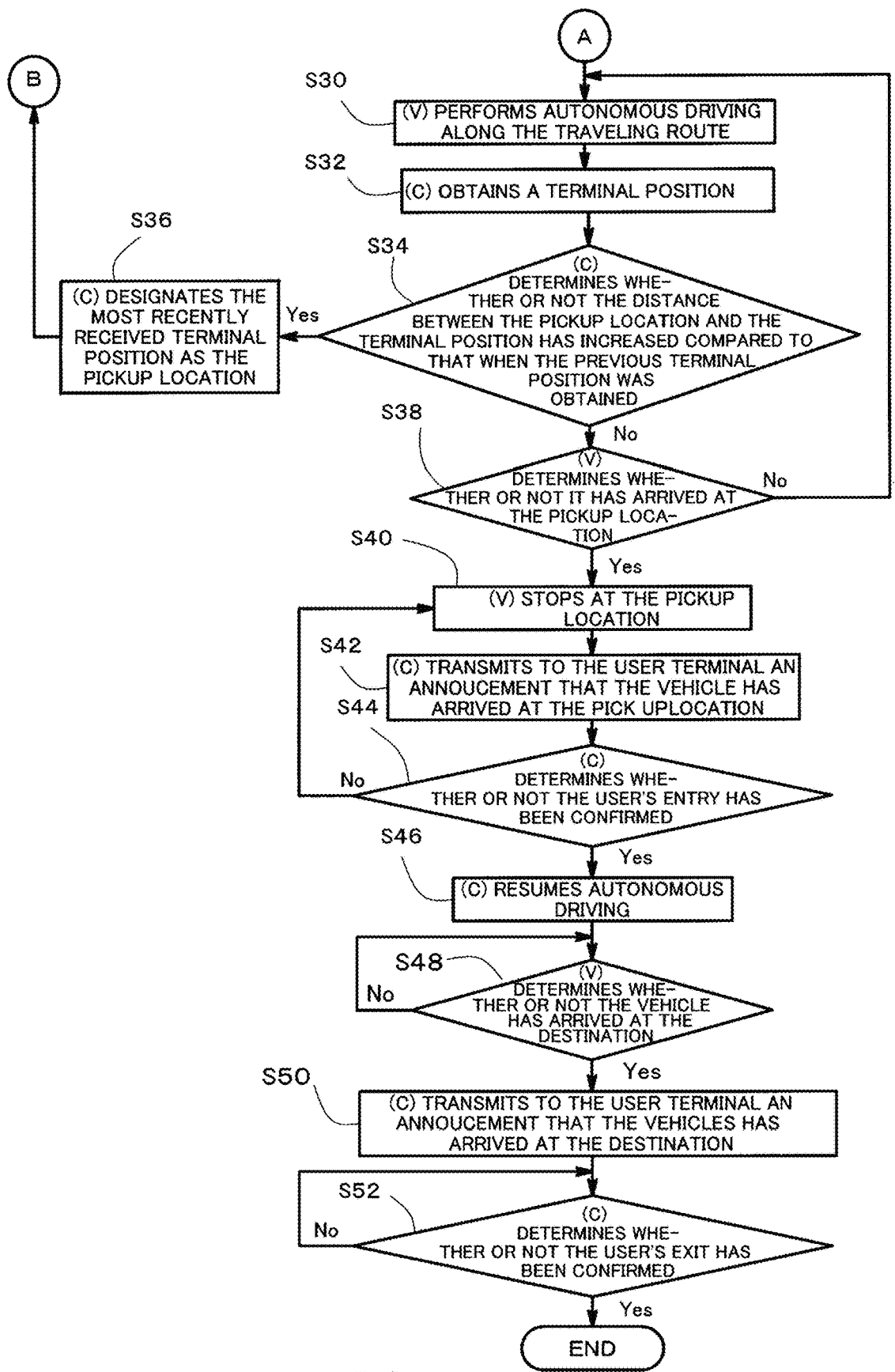
FIG. 5 illustrates a driving control flow (2 of 2) of the autonomous vehicle according to the illustrated embodiment.
Figure 6:
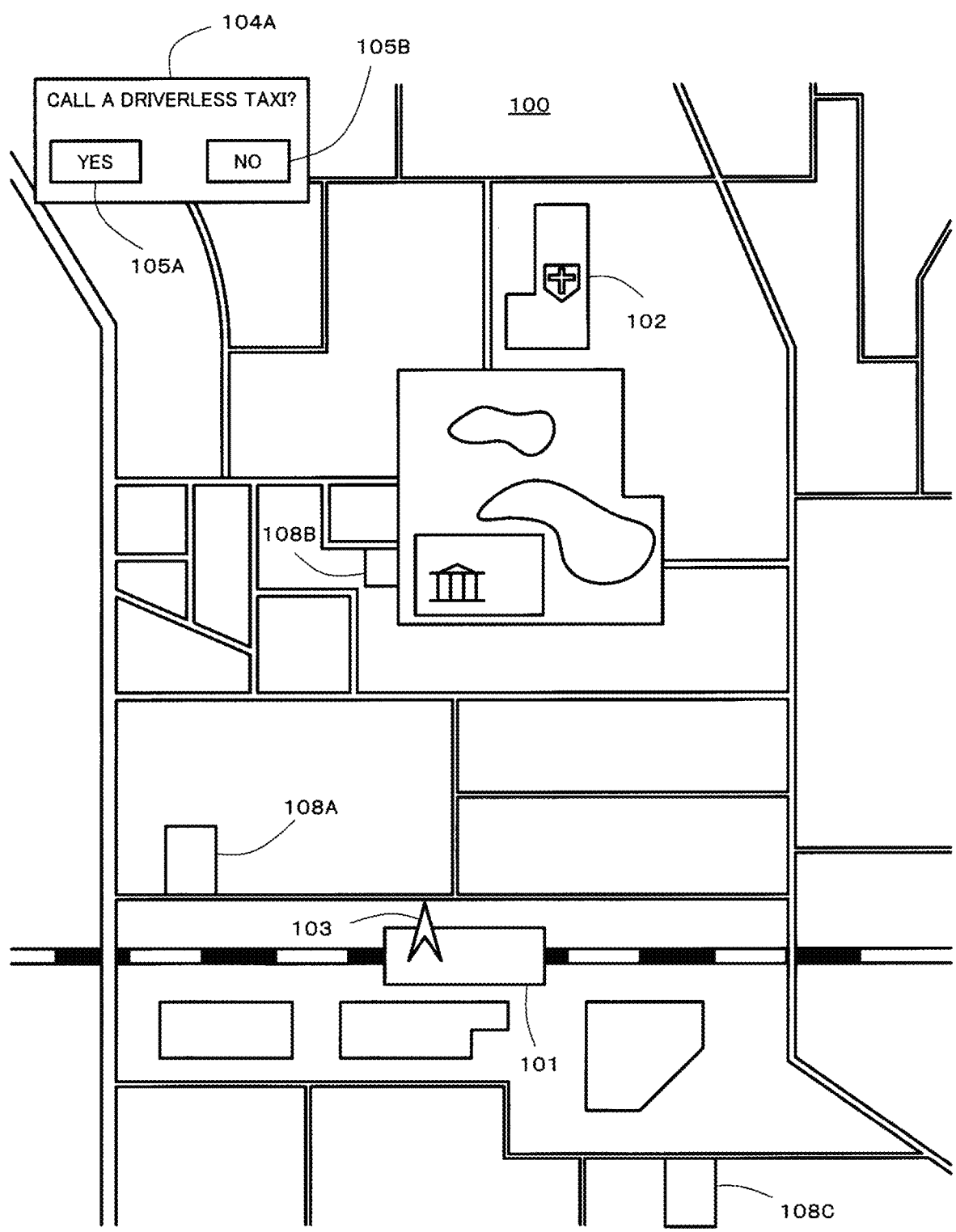
FIG. 6 is an image of a driverless taxi app that is being executed, the image illustrating an instance in which a dispatch request is input.

FIGS. 4 and 5 illustrate a driving control flow in a dispatch system for the autonomous vehicle 10 according to the illustrated embodiment. This driving control flow provides an example of a dispatch flow (or pickup flow) that starts from a point in time when a driverless taxi service user calls a driverless taxi and proceeds until the autonomous vehicle 10 is sent to the pickup location. The autonomous vehicle 10 then transports the passenger from the pickup location to the destination; this transportation flow is also included in the driving control flow. When a distinction is made between the dispatch flow and the transportation flow, referring to FIGS. 4 and 5, a process from the start step to step S44 corresponds to the dispatch flow (or pickup flow), and a process from step S46 to the end step corresponds to the transportation flow.

The flowchart in FIGS. 4 and 5 indicates which device performs each step. (U) represents a user terminal, that is, the mobile terminal 70 that the user is carrying. (C) represents the vehicle control device 50, and (V) represents the autonomous vehicle 10.

FIGS. 6 to 14 illustrate images that are displayed on the display 74 of the mobile terminal 70 during the execution of the driving control flow in FIGS. 4 and 5. The images are displayed in response to the driverless taxi app 82 controlling the display 74.

For example, FIGS. 6 to 14 provide an example in which the user rides in the autonomous vehicle 10 from a station 101 to a hospital 102 using a driverless taxi service. In the example illustrated in FIGS. 6 to 14, a map image 100 shows parking lots 108A, 108B, and 108C where autonomous vehicles 10 can wait.

Users who wish to use a driverless taxi service complete user registration prior to use. The user can then use a driverless taxi service by opening the driverless taxi app 82 on the mobile terminal 70 (user terminal) and logging in by entering the account ID and password set during the user registration process.

When logging in to the driverless taxi app 82, the account ID serving as a user identification code, the identification code for the mobile terminal 70 (user terminal), and other information are transmitted to the vehicle control device 50. The vehicle control device 50 retrieves, from the user registration information memory 67, user information (including the user name and the history of use) that is associated with the received account ID.

The vehicle control device 50 obtains the current position (terminal position) from the position determiner 78 of the mobile terminal 70, extracts map information concerning an area near the terminal position from the dynamic map memory 66, and then transmits the extracted map information to the mobile terminal 70. The driverless taxi app 82 of the mobile terminal 70 causes the received map image 100 (see FIG. 6) to be displayed on the display 74. The map information includes a mark image representing a terminal position 103 that is superimposed on the map image 100.

The driverless taxi app 82 causes a message box 104A to be superimposed on the map image 100. This message box 104A includes selection buttons 105A (YES) and 105B (NO) that enable selection of whether or not to make a driverless taxi dispatch request. For example, the selection button 105A is clicked in response to the user tapping on the touch panel that integrates the input unit 73 and the display 74, to thereby input a dispatch request (S10 in FIG. 4).

To simplify the operation, the process may proceed assuming that a dispatch request is input when the user opens the driverless taxi app 82 and then enters the account ID and the password to log in.

Figure 7:
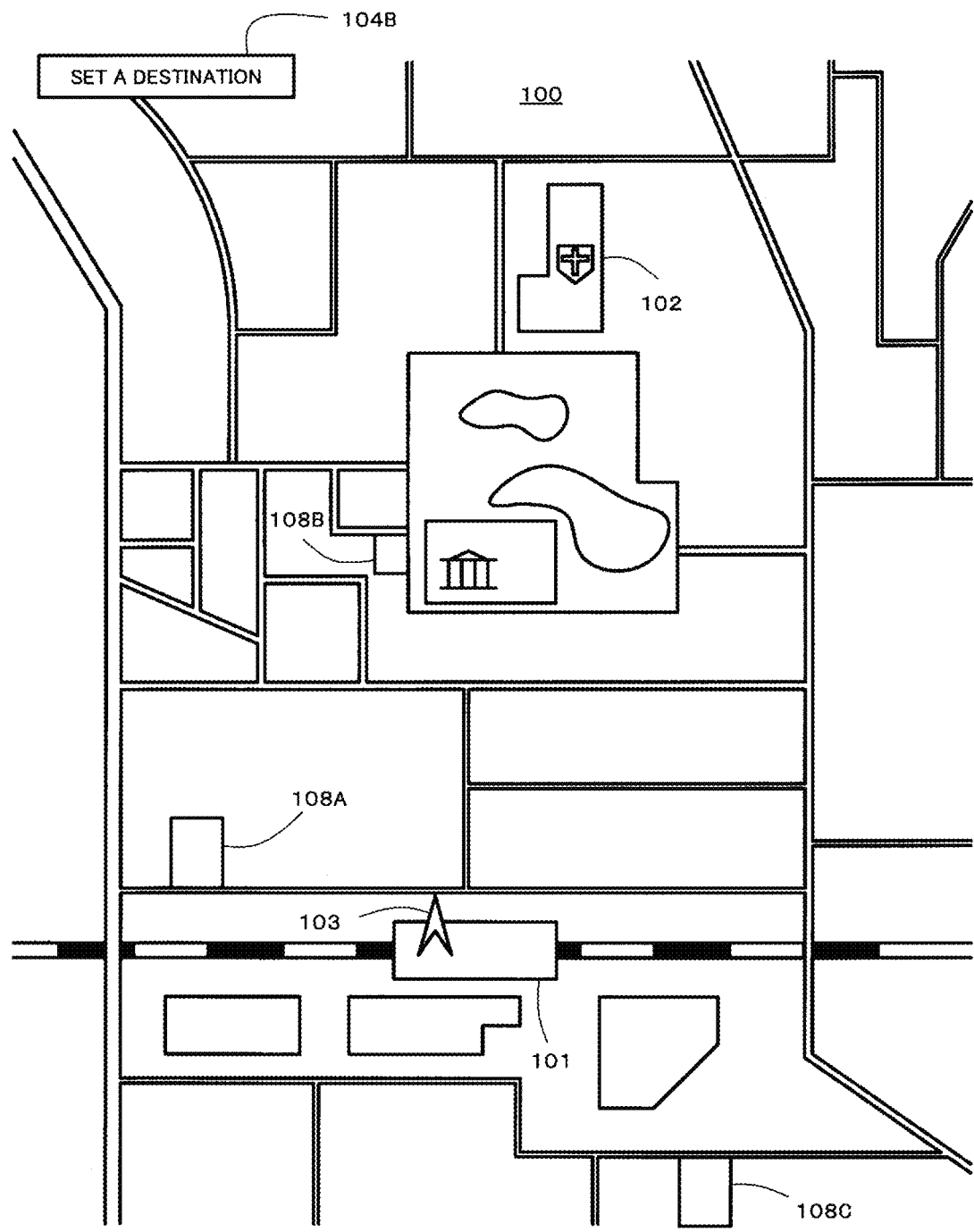
FIG. 7 is an image of the driverless taxi app that is being executed, the image illustrating an instance in which a destination is input.

After a dispatch request is input, as illustrated in FIG. 7, the driverless taxi app 82 causes a message box 104B to be displayed on the map image 100 to prompt for input of a destination. As prompted by this message box 104B, the user of the mobile terminal 70 inputs a destination (S12 in FIG. 4).

Figure 8:
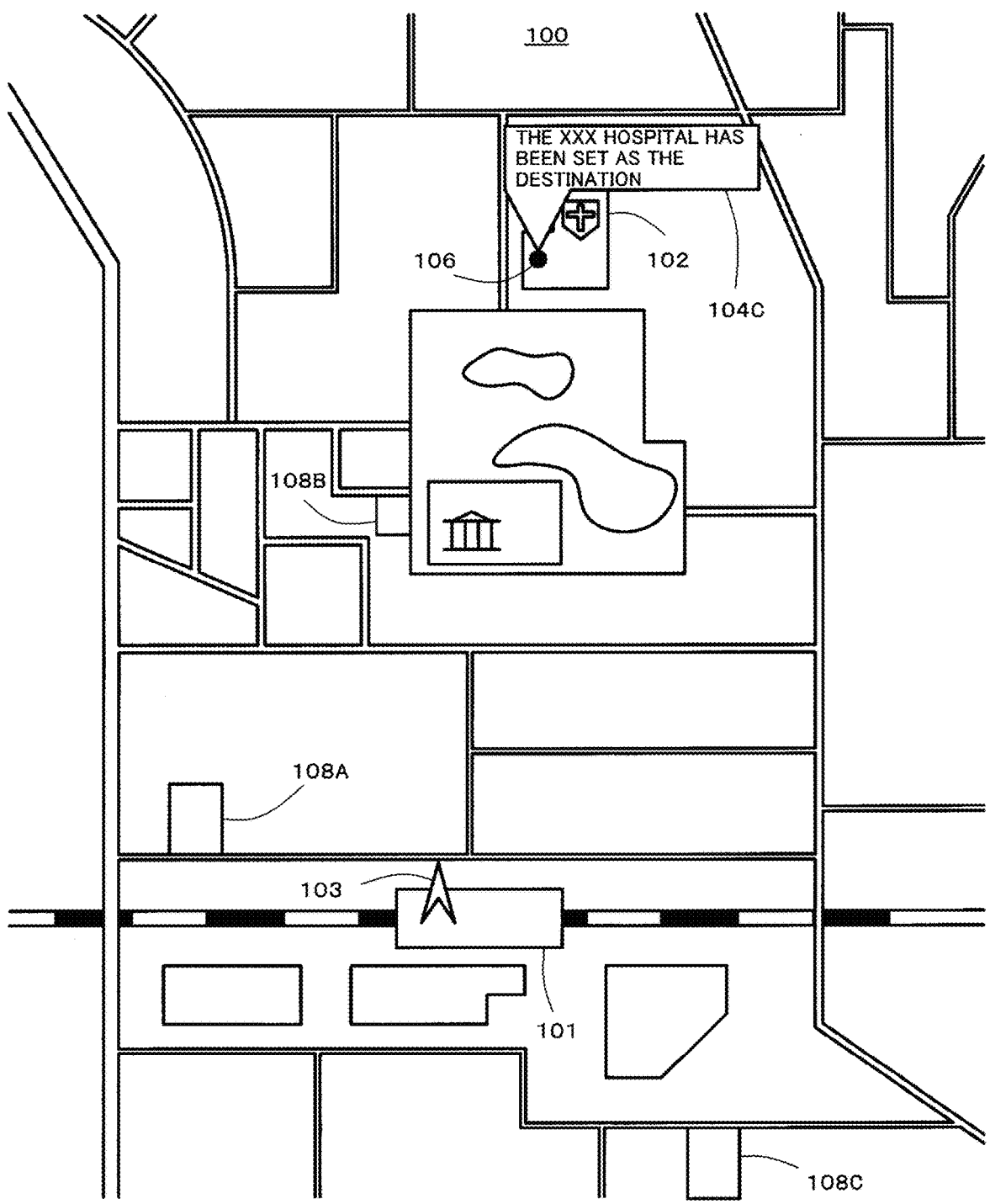
FIG. 8 is an image of the driverless taxi app that is being executed, the image illustrating an instance in which the destination is confirmed.

For example, any desired point on the map image 100 that is displayed on the touch panel that integrates the display 74 and the input unit 73, such as a pixel within the display area of the hospital 102, may be designated by the user through, for example, tapping. After a destination is input, as illustrated in FIG. 8, the driverless taxi app 82 causes a message box 104C to be displayed on the map image 100 to provide a confirmation message that the destination has been set.

Figure 9:
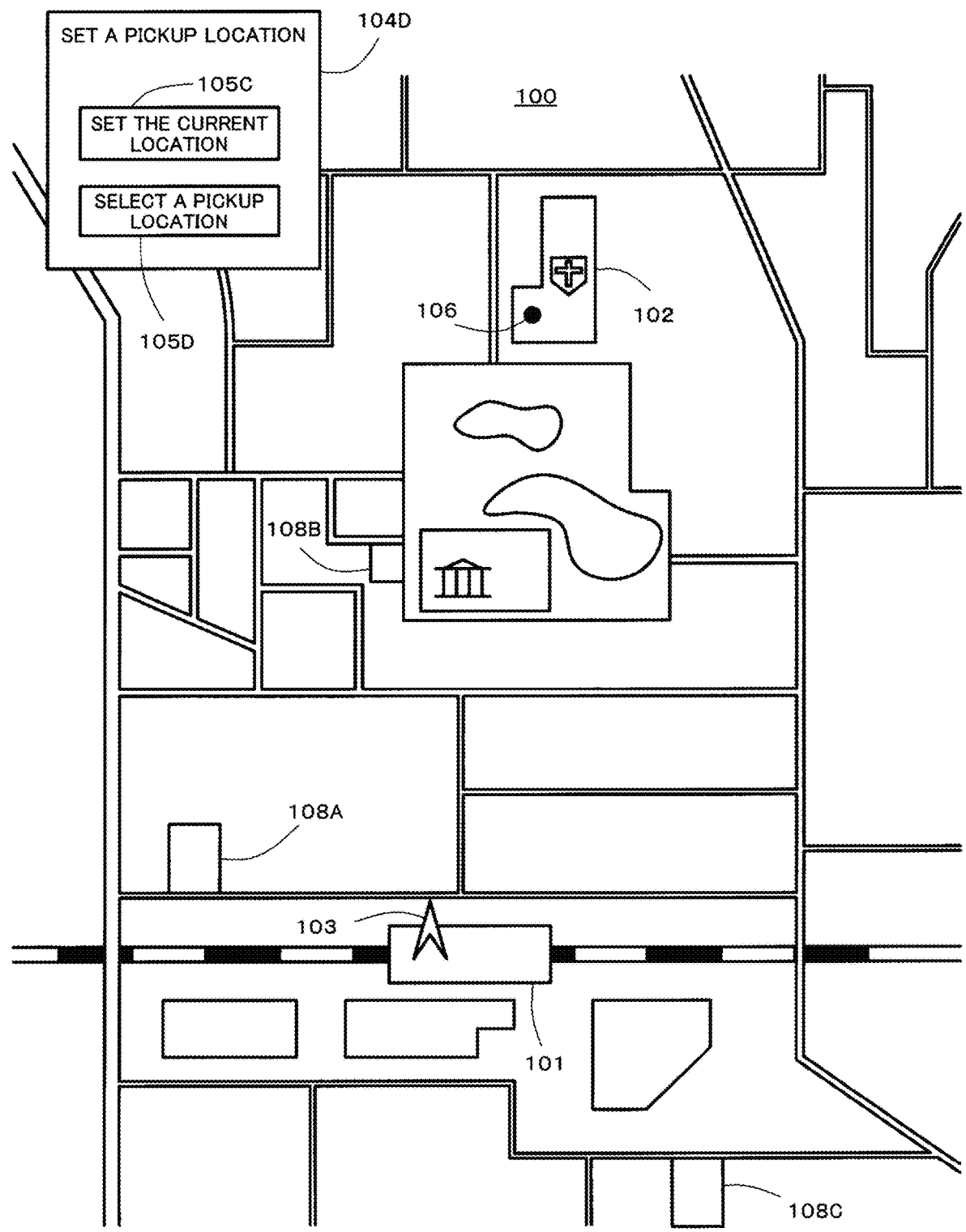
FIG. 9 is an image of the driverless taxi app that is being executed, the image illustrating an instance in which a pickup location is selected.

Next, as illustrated in FIG. 9, the driverless taxi app 82 causes a message box 104D to be displayed on the map image 100 to prompt for setting of a pickup location. The pickup location is the location at which the user boards the autonomous vehicle 10 that is a dispatched vehicle, and the message box 104D includes a button 105D that enables selection of any desired location as the pickup location by the user and a button 105C that enables selection of the user's current position, that is, the terminal position 103, as the pickup location. The selection buttons 105C and 105D are operable (capable of receiving input) via the input unit 73 on the touch panel.

For example, when the autonomous vehicle 10 is expected to arrive at the pickup location in a short time, or under bad weather conditions such as rain, the terminal position 103 is selected as the pickup location. On the other hand, when, due to, for example, traffic congestion around the current position, it is expected to take a long time to arrive at the pickup location and the weather is fine, a location that is closer to the destination 106 than the terminal position 103 may be selected as the pickup location, so that the user can move even a little toward the destination by themselves. In this case, the selection button 105D is selected through, for example, tapping by the user. Any desired location on the map image 100 is then designated as the pickup location by the user through, for example, tapping.

One of the parking lots 108A, 108B, and 108C, which are nearby waiting locations provided for the autonomous vehicles 10 around the terminal position 103, may also be selected as the pickup location, and in this case as well, the selection button 105D is selected through, for example, tapping by the user. After the selection button 105D is selected, one of the parking lots 108A, 108B, and 108C on the map image 100 is designated as the pickup location by the user through, for example, tapping.

It should be noted that, when, for example, the current position or the selected pickup location is located in a no parking or stopping zone, a location outside that zone may be set as the pickup location.

When the basic settings define that every autonomous vehicle 10 performs tracking driving control as will be described below, the terminal position 103 may be always (automatically) set as the pickup location. Such settings enable relieving the user from having to set the pickup location.

Figure 10:
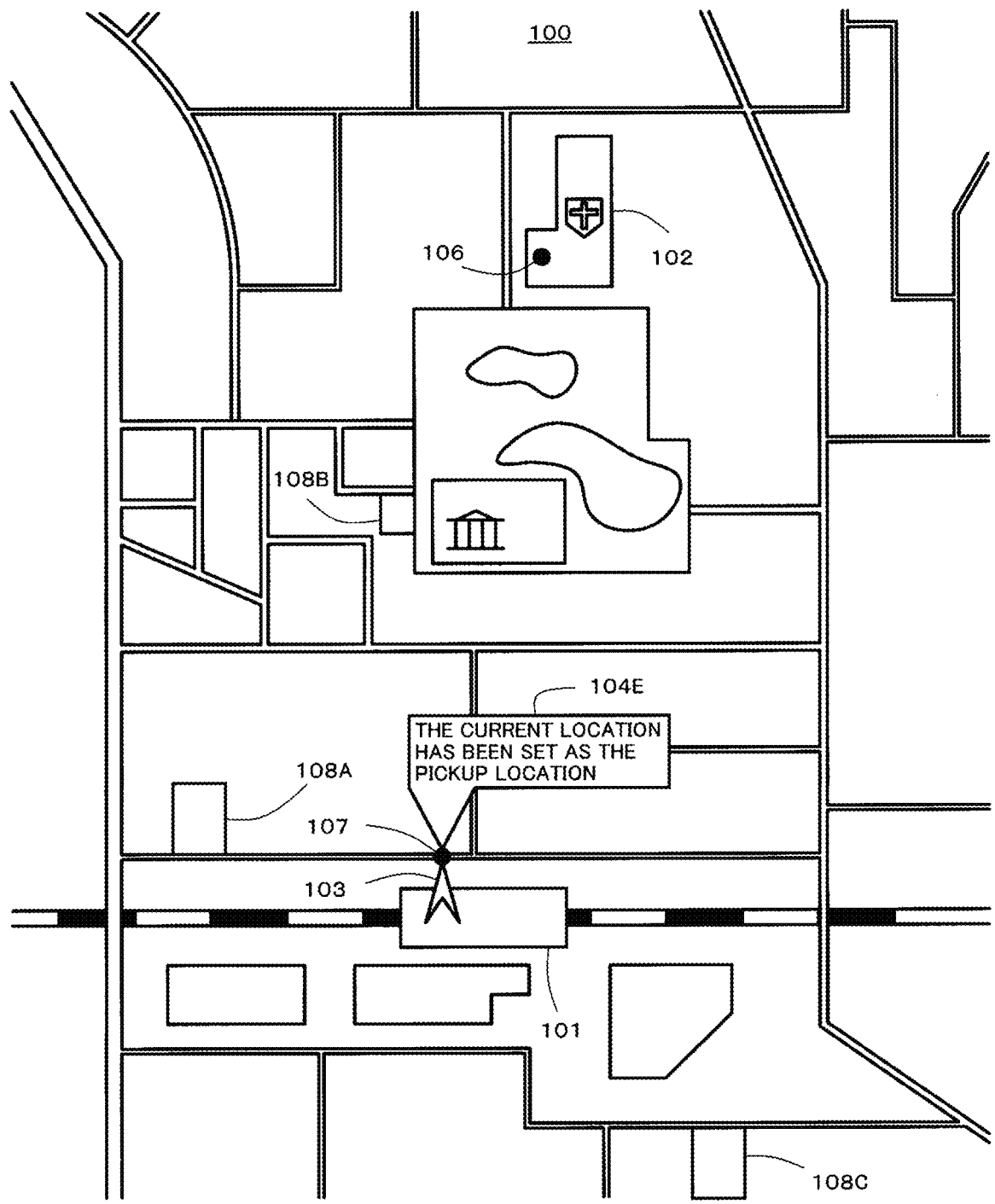
FIG. 10 is an image of the driverless taxi app that is being executed, the image illustrating an instance in which the pickup location is confirmed.

In response to the terminal position 103 being designated as the pickup location (S14), for example, as illustrated in FIG. 10, the driverless taxi app 82 causes a mark image representing the pickup location 107 to be superimposed at the terminal position 103 on the map image 100. Additionally, the driverless taxi app 82 causes a message box 104E to be displayed on the map image 100 to provide a confirmation message that the pickup location 107 has been set.

Next, the driverless taxi app 82 transmits, to the vehicle control device 50, information concerning the pickup location that has been set (S16). In response, the vehicle control device 50 searches for a vacant vehicle in the vicinity of the pickup location (S18). For example, the vehicle control device 50 obtains position information concerning all autonomous vehicles 10 that are under the control of the vehicle control device 50, from the position determiner 13 of each of the vehicles via the transceiver 43. The operation information checker 62 of the vehicle control device 50 then searches for an autonomous vehicle 10 that has not been dispatched, or, in other words, that is vacant (waiting to be assigned a passenger) at the time of search.

Based on the information obtained as described above, the operation information checker 62 extracts autonomous vehicles 10 that are vacant and located near the pickup location, as dispatchable vehicles. Vehicle information concerning each of the dispatchable vehicles, including identification number, body color, state of charge, and other information, and the position information are then transmitted from the operation information checker 62 to the mobile terminal 70 (user terminal) (S20). Dispatchable vehicle count data, the number of dispatchable vehicles in the parking lots 108A, 108B, and 108C where autonomous vehicles 10 are waiting, is also transmitted to the mobile terminal 70.

Figure 11:
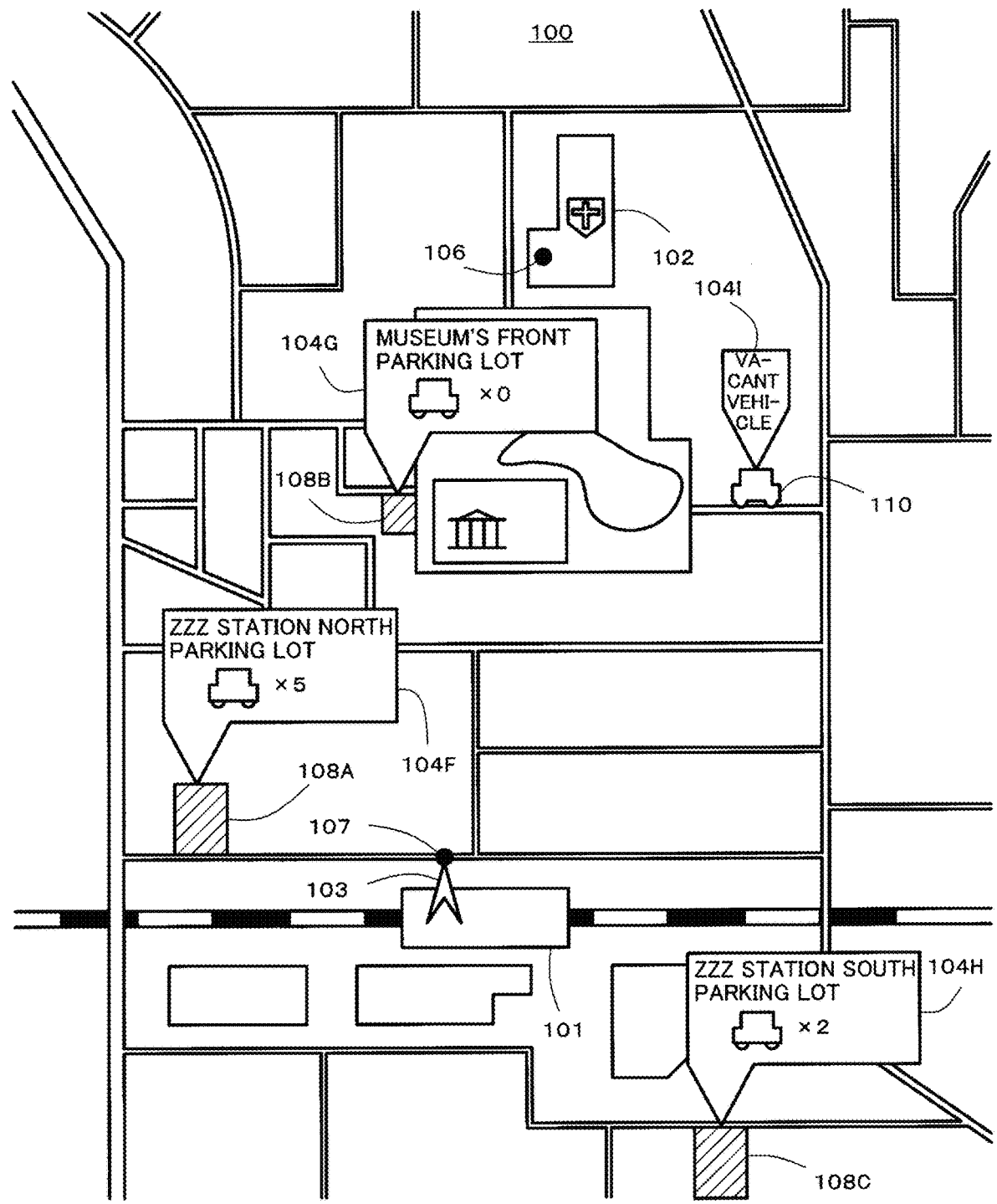
FIG. 11 is an image of the driverless taxi app that is being executed, the image illustrating an instance in which a vehicle that is to be dispatched is selected (wide area selection)

In response to the mobile terminal 70 receiving information concerning the dispatchable vehicles and the parking lots 108A, 108B, and 108C, the driverless taxi app 82 of this terminal causes the information concerning the dispatchable vehicles to be displayed on the map image 100 as illustrated in FIG. 11. For example, the driverless taxi app 82 causes message boxes 104F, 104G, 104H to be displayed on the map image 100 to indicate counts of dispatchable vehicles that are waiting in the respective parking lots 108A, 108B, and 108C. Additionally, the driverless taxi app 82 causes to be displayed on the map image 100 a cruising dispatchable vehicle 110, which is vacant and traveling on a road, and a message box 104I.

Figure 12:
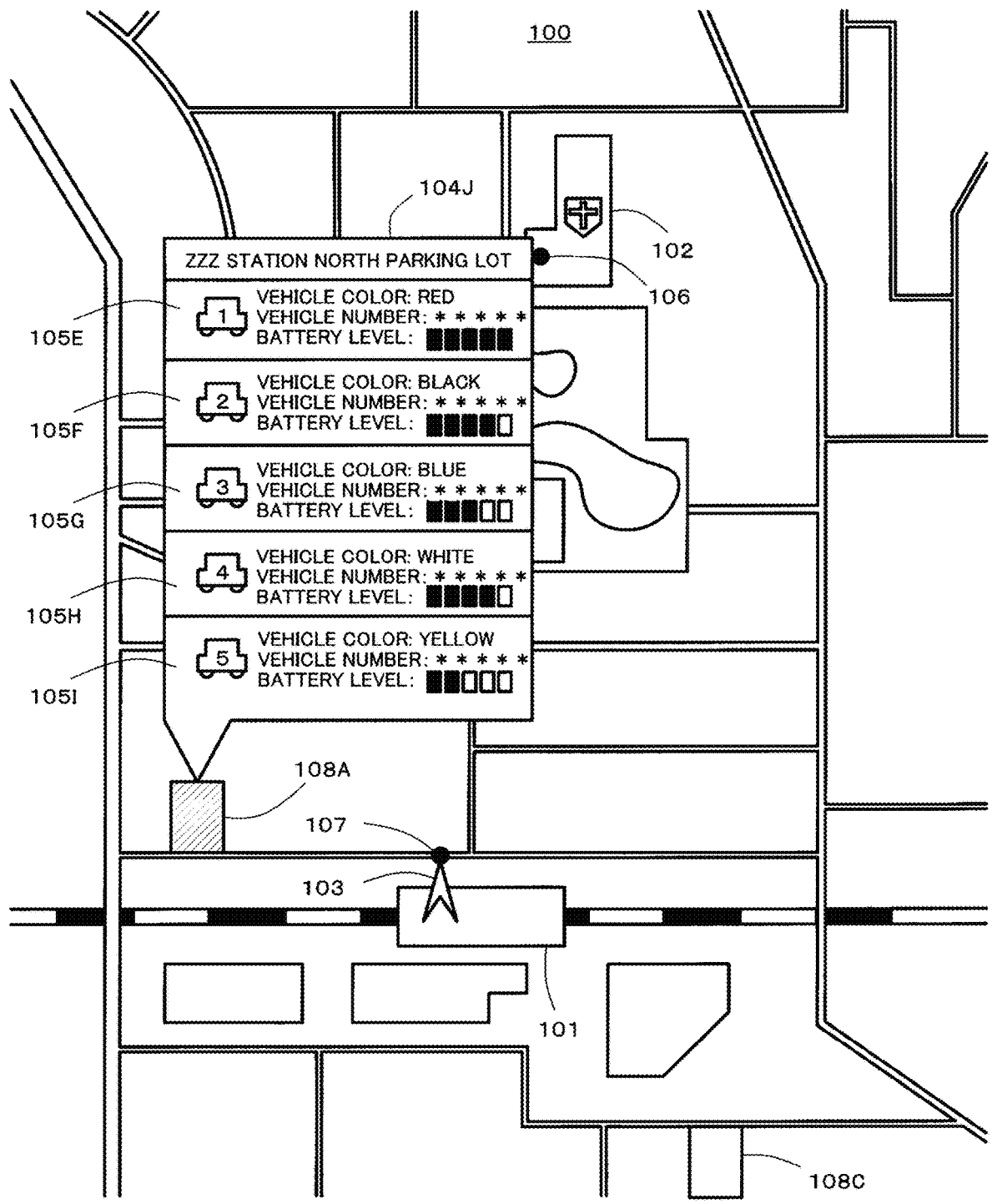
FIG. 12 is an image of the driverless taxi app that is being executed, the image illustrating an instance in which a vehicle that is to be dispatched is selected (zoomed-in selection)

The dispatchable vehicle selection image in FIG. 11 provides for wide area selection, and in response to selection of one of the parking lots 108A, 108B, and 108C through, for example, tapping by the user, a zoomed-in image for narrowed-down selection as illustrated in FIG. 12 is displayed. Specifically, the driverless taxi app 82 causes a message box 104J to be displayed on the map image 100 to provide vehicle information concerning dispatchable vehicles in the selected parking lot (in FIG. 12, the parking lot 108A). This message box 104J includes a display area that displays the vehicle information concerning dispatchable vehicles, and this area itself functions as selection buttons 105E, 105F, 105G, 105H, and 105I.

In response to selection of one of the selection buttons 105E, 105F, 105G, 105H, and 105I through, for example, tapping by the user (S22), vehicle information such as an identification code for the selected autonomous vehicle (vehicle that is to be dispatched) is transmitted from the mobile terminal 70 to the vehicle control device 50. The traveling route generator 60 of the vehicle control device 50 generates a traveling route that connects from the current location of the autonomous vehicle to the destination 106 via the pickup location 107 (S24). Then, based on the generated traveling route, the arrival time calculator 64 calculates an estimated time of pickup location arrival (the time at which the dispatched vehicle is expected to arrive at the pickup location 107 after it starts from the current location) and an estimated time of destination arrival (the time at which the dispatched vehicle is expected to arrive at the destination 106 after it starts from the pickup location 107 (S26)). These estimated times of arrival are calculated based on, for example, information concerning traffic congestion and speed limits along the route of travel.

The navigation map generator 63 generates data including the map image 100 with the traveling route superimposed thereon. The map image 100 with the traveling route superimposed thereon, and information concerning the estimated time of pickup location arrival and the estimated time of destination arrival are transmitted from the transceiver 61 of the vehicle control device 50 to the mobile terminal 70 and to the autonomous vehicle 10 that is selected as a vehicle that is to be dispatched (S28).

In response, as illustrated in FIG. 13, the driverless taxi app 82 of the mobile terminal 70 causes the map image 100 with the traveling route 111 superimposed thereon to be displayed on the display 74. Additionally, the driverless taxi app 82 causes a message box 104K and an image of a dispatched vehicle 112 to be superimposed on the map image 100. The message box 104K provides vehicle information, an estimated time of pickup location arrival, and an estimated time of destination arrival.

Letting the user know the estimated time of pickup location arrival enables providing the user with information upon which to base a decision as to whether to wait at the pickup location 107 or whether they should start moving toward the destination 106 on their own.

In response to receiving the map image 100 as illustrated in FIG. 13 and information concerning the estimated time of pickup location arrival and the estimated time of destination arrival from the vehicle control device 50, the dispatched vehicle 112 autonomously drives toward the pickup location 107 (S30). Specifically, based on the dynamic data stored in the navigation map memory 44 and the traveling route 111, the autonomous driving controller 42 performs autonomous driving control.

During a period in which, after a dispatch request is received, the dispatched vehicle 112 is on its way to pick up the user, or, in other words, moving from the parking lot 108A to the pickup location 107, the transceiver 61 of the vehicle control device 50 intermittently obtains the position of the mobile terminal 70 (user terminal), that is, the terminal position 103 (S32). For example, the transceiver 61 obtains the terminal position 103 at intervals of one minute. For example, the transceiver 61 accesses the authenticator 81 of the mobile terminal 70 to receive permission to obtain data, and then obtains position information from the position determiner 78.

Based on the intermittently received terminal position, the traveling route generator 60 determines whether or not the terminal position moves away from the pickup location 107 over time. Specifically, the traveling route generator 60 determines whether or not the distance between the pickup location 107 and the terminal position 103 has increased compared to that when the previous terminal position was obtained (S34).

Figure 14:
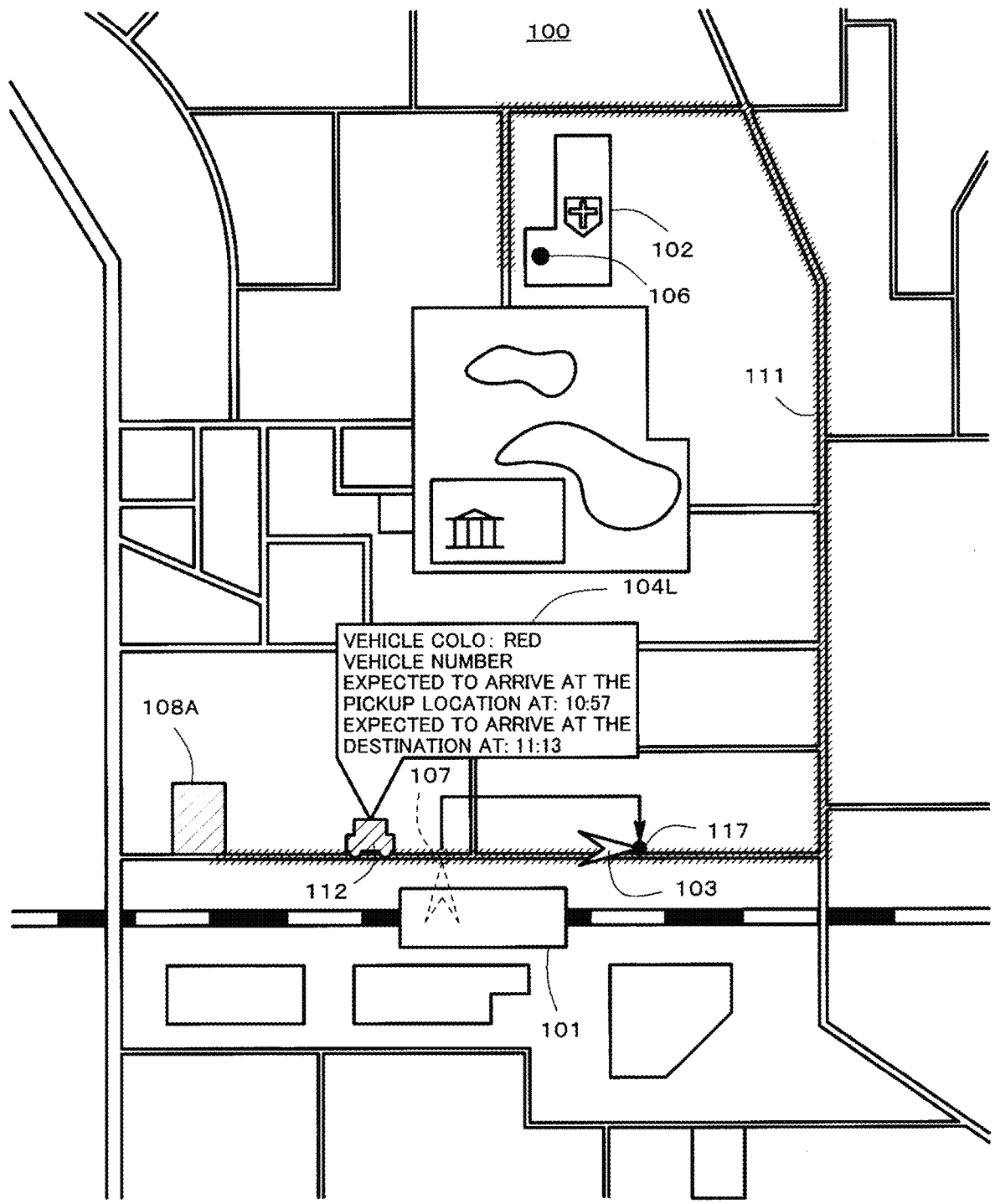
FIG. 14 is an image of the driverless taxi app that is being executed, the image illustrating a navigation screen used while the vehicle is on its way to pick up the user after the pickup location is changed.

For example, as illustrated in FIG. 14, the distance between the terminal position 103 and the pickup location 107 may increase compared to that when the terminal position was obtained at the previous time (for example, one minute ago). This indicates that the user is moving away from the pickup location 107. That is, it appears that the user no longer intends to wait at the pickup location 107; as such, the traveling route generator 60 resets the pickup location.

It should be noted that, rather than comparing the distance between the most recent terminal position and the pickup location 107 with the distance between the immediately previously obtained terminal position and the pickup location 107, for example, the change in distance over a plurality of most recent instances (for example, five instances) may be determined, and the pickup location may be reset when the [added to clarify what distance is "this (the) distance"; please feel free to delete if inappropriate.] distance gradually increases.

When resetting the pickup location, the traveling route generator 60 designates the most recently received terminal position 103 as a new pickup location 117 (S36). Then, referring to FIG. 4, the process returns to step S24, in which the traveling route generator 60 generates the traveling route 111 that passes through the new pickup location 117. In response, the autonomous driving controller 42 performs driving control based on the regenerated traveling route 111.

As described above, even after the pickup location has once been set, the pickup location is changed flexibly in accordance with the user's behavior, or, in other words, by tracking the user. This enables the user to feel free to move away from the pickup location 107 as they wish, rather than simply waiting for the dispatched vehicle 112 at the initially set pickup location 107.

Returning to step S34, when the distance between the pickup location 107 and the terminal position 103 is the same as or has decreased compared to that when the previous terminal position was obtained, autonomous driving of the dispatched vehicle 112 is continued along the existing traveling route 111. The dispatched vehicle 112 obtains position information from the position determiner 13 and determines whether or not the dispatched vehicle 112 itself has arrived at the pickup location 107 (S38). When it has not yet arrived at the pickup location 107, the dispatched vehicle 112 returns to step S30 and continues autonomous driving.

Upon arriving at the pickup location 107, the dispatched vehicle 112 stops there (S40) and waits for the user to enter the vehicle. The vehicle control device 50 obtains position information concerning the dispatched vehicle 112 intermittently (for example, at intervals of five seconds) and, in response to the vehicle's arrival at the pickup location 107, transmits to the mobile terminal 70 (user terminal) an announcement that the dispatched vehicle 112 has arrived at the pickup location (S42).

The driverless taxi app 82 of the mobile terminal 70 causes a message to be displayed on the map image 100 to indicate, for example, that the dispatched vehicle 112 has arrived at the pickup location. The vehicle control device 50 then determines whether or not the user's entry has been confirmed (S44). For example, an authentication device (not illustrated) provided in the dispatched vehicle 112 and the authenticator 81 of the mobile terminal 70 perform an authentication process using wireless means such as Bluetooth (registered trademark). A result of this authentication is transmitted from the dispatched vehicle 112 to the vehicle control device 50 and leads to the determination that the user has entered the dispatched vehicle 112.

In response to the confirmation of the user's entry, the pickup process is completed. The dispatched vehicle 112 resumes autonomous driving along the traveling route (S46). During autonomous driving, the dispatched vehicle 112 determines its own position using the position determiner 13 and determines whether or not it has itself arrived at the destination 106 (S48). When the dispatched vehicle 112 has not arrived at the destination 106, autonomous driving is continued.

On the other hand, the vehicle control device 50 obtains position information concerning the dispatched vehicle 112 intermittently (for example, at intervals of five seconds) and, in response to the vehicle arriving at the destination 106, transmits to the mobile terminal 70 (user terminal) an announcement that the dispatched vehicle 112 has arrived at the destination (S50).

The driverless taxi app 82 of the mobile terminal 70 causes a message to be displayed on the map image 100 to indicate, for example, that the dispatched vehicle 112 has arrived at the destination 106. The vehicle control device 50 then determines whether or not the user's exit has been confirmed (S52). For example, the authentication device (not illustrated) provided in the dispatched vehicle 112 and the authenticator 81 of the mobile terminal 70 perform an exit process using wireless means such as Bluetooth. A result of this process is transmitted from the dispatched vehicle 112 to the vehicle control device 50 and leads to the determination that the user has exited the dispatched vehicle 112.

As described above, in the autonomous vehicle dispatch system according to the illustrated embodiment, driving control of the autonomous vehicle 10 is performed so as to track the user. As such, rather than waiting at the pickup location for the dispatched vehicle 112 that is on its way to pick up the user, the user may begin walking toward the destination as the dispatched vehicle 112 tracks the user. The ability to be picked up in this manner enables improved user convenience in terms of setting a pickup location.

Modification Example of the Illustrated Embodiment

Although, in the embodiment illustrated in FIG. 3, generation of map data and confirmation of the user's entry and exit are performed by the vehicle control device 50, these processes may be performed by the autonomous vehicle 10. For example, FIG. 15 illustrates an autonomous vehicle dispatch system according to a modification example of the illustrated embodiment.

Figure 15:
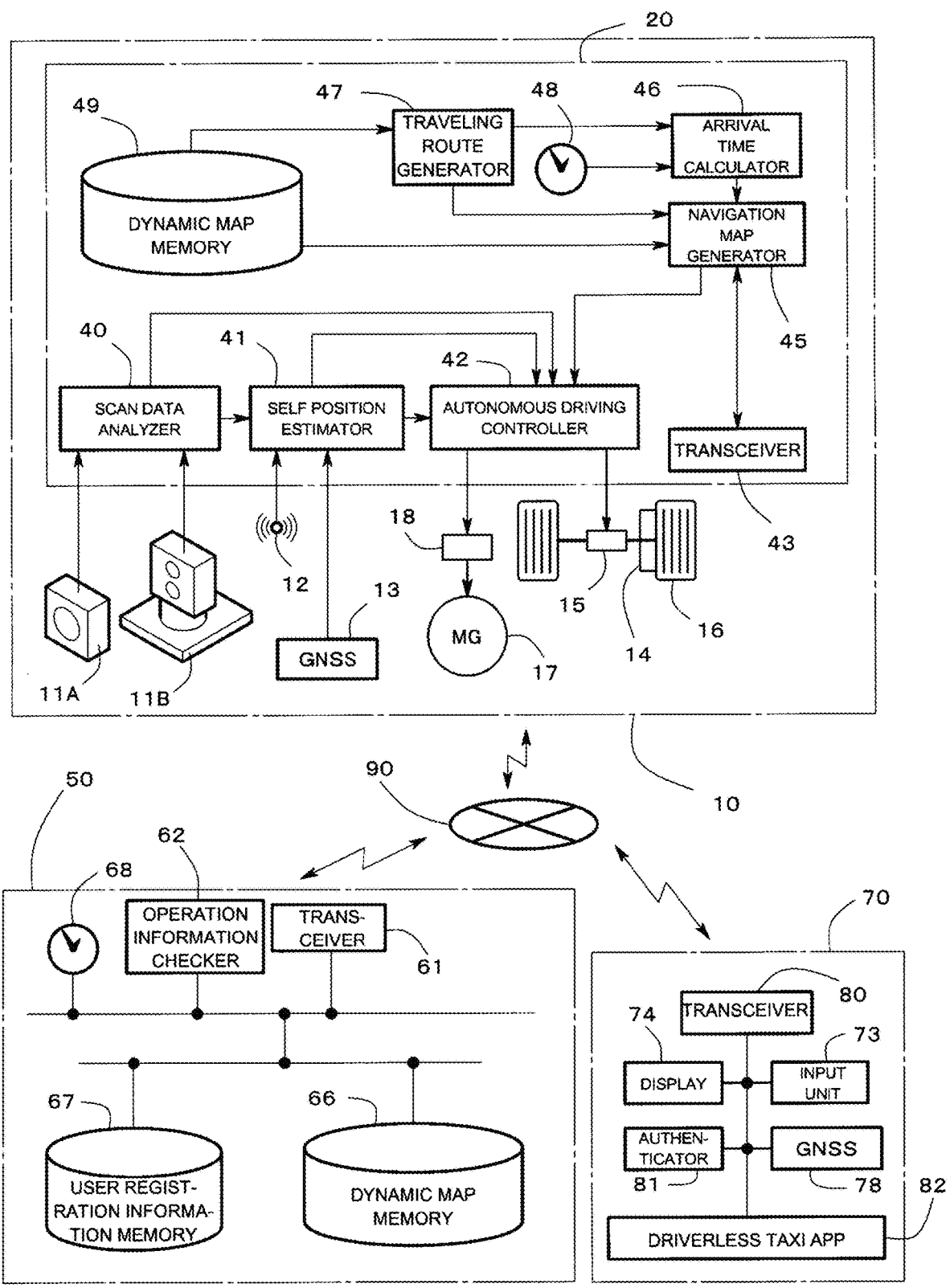
FIG. 15 is a functional block diagram illustrating an autonomous vehicle dispatch system according to a modification example of the illustrated embodiment.

FIG. 15 differs from FIG. 3 in that the vehicle control device 50 does not include the traveling route generator 60, the navigation map generator 63, or the arrival time calculator 64, and instead the controller 20 of the autonomous vehicle 10 includes a traveling route generator 47, a navigation map generator 45, an arrival time calculator 46, a clock 48, and a dynamic map memory 49.

Figure 16:
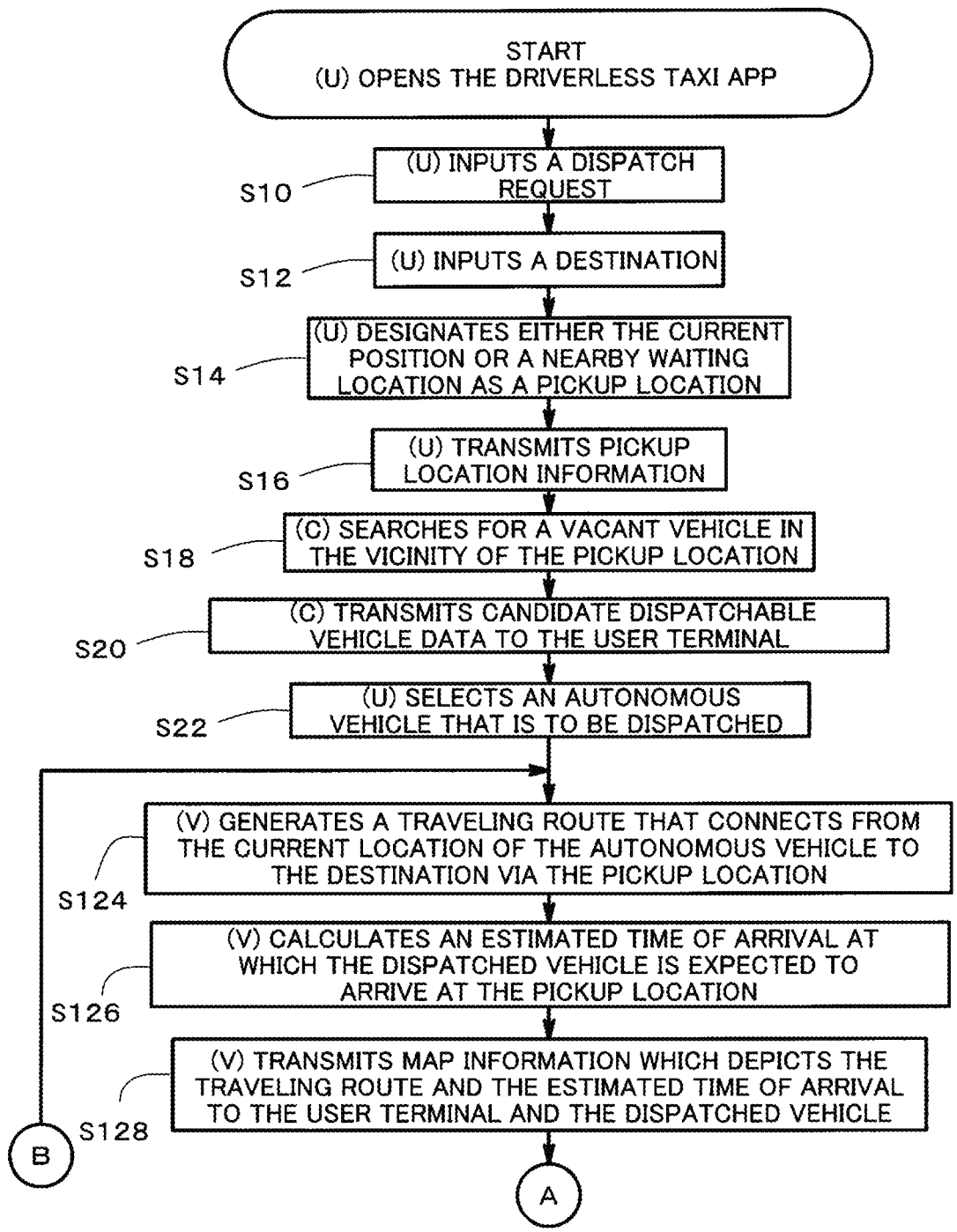
FIG. 16 illustrates a driving control flow (1 of 2) of an autonomous vehicle according to the modification example of the illustrated embodiment.
Figure 17:
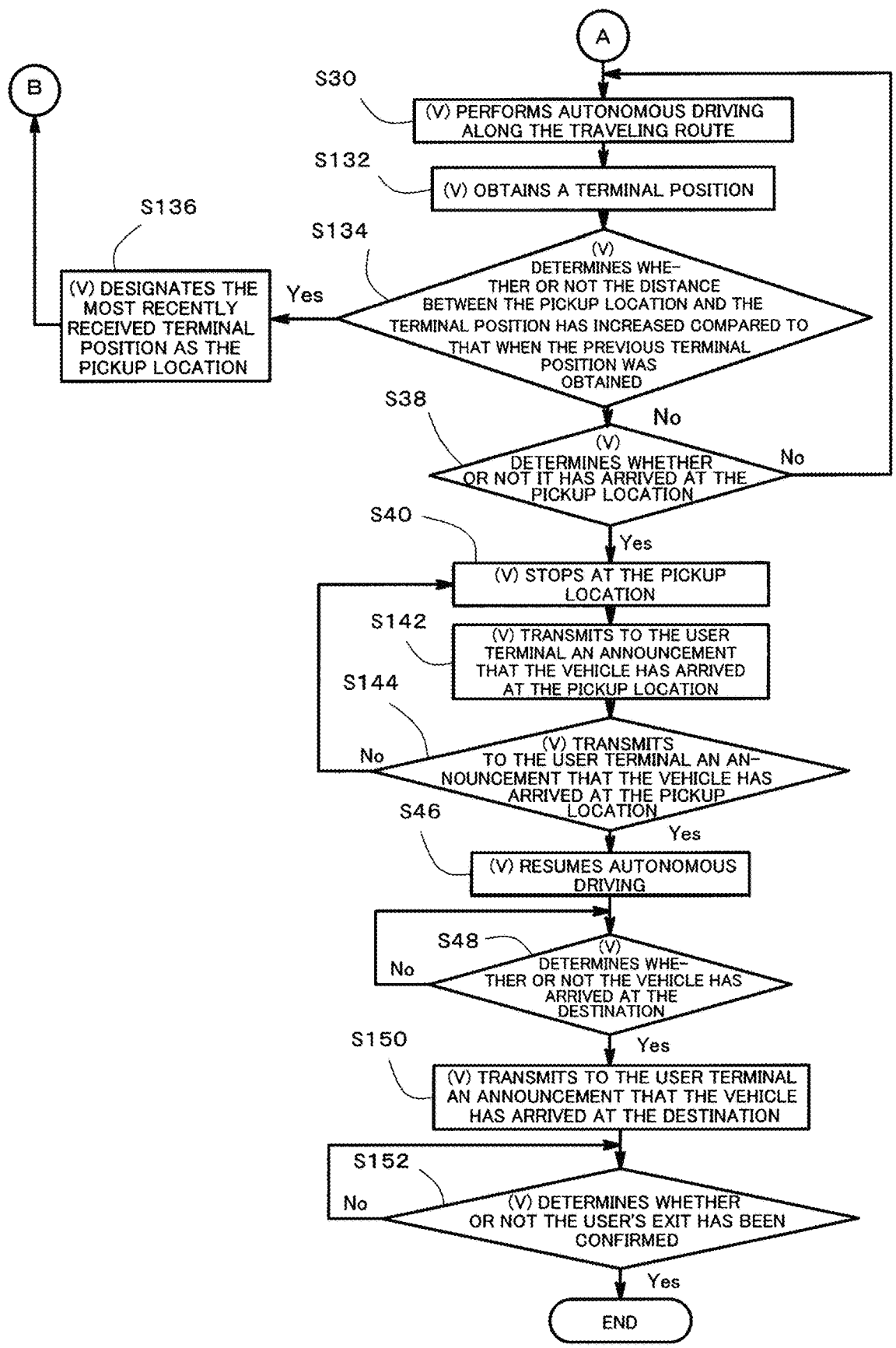
FIG. 17 illustrates a driving control flow (2 of 2) of the autonomous vehicle according to the modification example of the illustrated embodiment.

A driving control flow performed by the dispatch system illustrated in FIG. 15 is illustrated in FIGS. 16 and 17. When compared to the flowchart in FIGS. 4 and 5, steps S24, S26, S28, S32, S34, S42, S44, S50, and S52 performed by the vehicle control device 50 are replaced with steps S124, S126, S128, S132, S134, S142, S144, S150, and S152 in which the same processes are performed by the autonomous vehicle 10.

For example, in such a dispatch system, after a vehicle 112 (see, for example, FIG. 14) that is to be dispatched is selected by the user, this vehicle 112 performs the subsequent various types of processes including generation of a traveling route and subsequent change to the pickup location while independently performing communication with the mobile terminal 70.

For example, for pickup, in response to selection of one of the selection buttons 105E, 105F, 105G, 105H, and 105I (FIG. 12) through, for example, tapping by the user (S22), vehicle information such as an identification code for the selected autonomous vehicle (vehicle that is to be dispatched) is transmitted from the mobile terminal 70 to the vehicle control device 50. The vehicle control device 50 provides a dispatch instruction to the vehicle 112 that is to be dispatched (FIG. 13). This dispatch instruction contains information concerning a position of the mobile terminal 70 (terminal position), an identification code for the mobile terminal 70, the user account ID, and the user's name, pickup location, and destination.

In response to the dispatch instruction, the traveling route generator 47 of the vehicle 112 that is to be dispatched generates a traveling route that connects from the current location of the vehicle itself to the destination 106 via the pickup location 107 (S124). Then, based on the generated traveling route, the arrival time calculator 46 calculates an estimated time of pickup location arrival and an estimated time of destination arrival (S126).

The navigation map generator 45 then generates data including the map image 100 with the traveling route superimposed thereon. The transceiver 43 transmits this data to the mobile terminal 70 along with information concerning the estimated time of pickup location arrival and the estimated time of destination arrival (S128).

Subsequently, the dispatched vehicle 112 performs autonomous driving toward the pickup location 107 along the traveling route 111 as illustrated in FIG. 13 (S30). During autonomous driving, the transceiver 43 intermittently obtains the position of the mobile terminal 70 (user terminal), that is, the terminal position 103 while the dispatched vehicle 112 is on its way to pick up the user, or, in other words, moving from the parking lot 108A to the pickup location 107 (S132).

The traveling route generator 47 determines whether or not the distance between the pickup location 107 and the terminal position 103 has increased compared to that when the previous terminal position was obtained (S134). In response to the determination that this distance has increased, the traveling route generator 47 then designates the most recently received terminal position 103 as a new pickup location 117 (S136). Returning to step S124 in the flowchart of FIG. 16, the traveling route generator 47 generates a traveling route that passes through the new pickup location 117. In response, the autonomous driving controller 42 performs driving control based on the regenerated traveling route.

Returning to step S134 again, when the distance between the pickup location 107 and the terminal position 103 is the same as or has decreased compared to that when the previous terminal position was obtained, autonomous driving of the dispatched vehicle 112 is continued along the existing traveling route 111.

The dispatched vehicle 112 obtains position information from the position determiner 13 and determines whether or not the dispatched vehicle 112 itself has arrived at the pickup location 107 (S38), and in response to the determination that it has arrived at the pickup location 107, the dispatched vehicle 112 stops there (S40) and waits for the user to enter the vehicle. After the dispatched vehicle 112 transmits to the mobile terminal 70 (user terminal) an announcement that the dispatched vehicle 112 has arrived at the pickup location, and confirms the user's entry (S142 and S144), the dispatched vehicle 112 resumes autonomous driving to the destination (S46, S48, S150, and S152).

The present disclosure is not limited to the present embodiments described above, and includes all changes and modifications without departing from the technical scope or the essence of the present disclosure defined by the claims.

The invention claimed is:

1. An autonomous vehicle dispatch system comprising:
a mobile terminal carried by a user, the mobile terminal including an input unit that is capable of receiving input of a dispatch request and a destination and a position determiner that is capable of obtaining a terminal position which is its own current position; and
an autonomous vehicle that, in accordance with the dispatch request, is designated as a vehicle that is to be dispatched,
a vehicle control device that is capable of communication with the mobile terminal and the autonomous vehicle,
wherein the input unit of the mobile terminal is capable of receiving input of a waiting location provided around the terminal position as a pickup location,
wherein the vehicle control device comprises:
a traveling route generator that generates a traveling route that connects from a current position of the autonomous vehicle to the destination via the pickup location; and
a transceiver that is capable of transmitting information concerning the travel route to the autonomous vehicle,
wherein the autonomous vehicle includes an autonomous driving controller that performs driving control based on the traveling route,
wherein, after reception of the dispatch request, the transceiver intermittently receives information concerning the terminal position from the mobile terminal,
wherein when the traveling route generator detects that the mobile terminal is moving away from the pickup location over time based on multiple terminal positions intermittently received, the traveling route generator designates a most recent terminal position as a new pickup location and generates a new traveling route that passes through the new pickup location, and
wherein the autonomous driving controller of the autonomous vehicle is configured to perform the driving control based on the new traveling route,
wherein the traveling route generator obtains a change in a distance between the terminal position and the pickup location over a five most recent terminal positions intermittently received, and when the traveling route generator detects that the mobile terminal is moving away from the pickup location over a predetermined time based on the obtained change in the distance, the traveling route generator designates the most recently received terminal position as the new pickup location, and generates the new traveling route.

2. The autonomous vehicle dispatch system according to claim 1, wherein the mobile terminal includes a display that is capable of displaying a map image which depicts the traveling route.

3. The autonomous vehicle dispatch system according to claim 2,
wherein the vehicle control device includes an arrival time calculator that calculates an estimated time of arrival at which the dispatched vehicle is expected to arrive at the pickup location,
wherein the display of the mobile terminal is capable of displaying the estimated time of arrival.

4. An autonomous vehicle that is capable of communication with a mobile terminal, the mobile terminal including an input unit that is capable of receiving input of a dispatch request and a destination and a position determiner that is capable of obtaining a terminal position which is its own current position,
wherein, in response to output of the dispatch request from the mobile terminal, in accordance with the dispatch request, the autonomous vehicle is designated as a vehicle that is to be dispatched, and
wherein the autonomous vehicle includes:
a travel route generator that generates a travel route that connects from a self vehicle position to the destination via a pickup location provided around the terminal position input through the input unit of the mobile terminal, and
an autonomous driving controller that performs driving control based on the traveling route,
wherein when the traveling route generator detects that the mobile terminal is moving away from the pickup location over time based on multiple terminal positions intermittently received, the traveling route generator designates a most recently-received terminal position as a new pickup location, and generates a new traveling route that passes through the new pickup location, and
the autonomous driving controller of the autonomous vehicle is configured to perform the driving control based on the new traveling route,
wherein the traveling route generator obtains a change in distance between the terminal position and the pickup location over a five most recent terminal positions intermittently received, and when the traveling route generator detects that the mobile terminal is moving away from the pickup location over a predetermined time based on the obtained change in the distance, the traveling route generator designates the most recently received terminal position as the new pickup location, and generates the new traveling route.

* * * * *